United States Patent [19]

Watanabe et al.

[11] Patent Number: 5,255,266

[45] Date of Patent: Oct. 19, 1993

[54] ATM SWITCHING UNIT

[75] Inventors: Yoshihiro Watanabe, Yokohama; Junichi Yamazaki, Atsugi; Kazuo Hajikano, Suwarashi; Toshio Shimoe, Hadano; Yoji Tsuboi, Tokyo; Norihito Nishimoto; Yoshiharu Sato, both of Yokohama, all of Japan

[73] Assignee: Fujitsu Limited, Kawasaki, Japan

[21] Appl. No.: 780,120

[22] Filed: Oct. 21, 1991

[30] Foreign Application Priority Data

Oct. 20, 1990 [JP] Japan .................................. 2-282636
Apr. 10, 1991 [JP] Japan .................................. 3-077474

[51] Int. Cl.$^5$ .......................................... H04L 12/56
[52] U.S. Cl. .................................................. 370/60.1
[58] Field of Search ................... 370/58.1, 58.2, 58.3, 370/60, 60.1, 67, 94.1, 94.2

[56] References Cited

U.S. PATENT DOCUMENTS 4,975,695 12/1990 Almond et al. ..................... 370/60.1
5,119,367 6/1992 Kawakatsu et al. .................. 370/60

Primary Examiner—Wellington Chin
Attorney, Agent, or Firm—Staas & Halsey

[57] ABSTRACT

A transmission line control processor performs various processes in response to requests of a call processor for capture, allotment, and release of a subscriber line or an inter-station line. Additionally, in response to requests of the call processor for a reservation, connection, and disconnection of a path, the transmission line control processor instructs an ATM switch to connect or disconnect the path. These processes can be performed using with the existing functions of ordinary call processors, and such complicated processes as the management of bands at ATM switches are executed exclusively by a transmission line control processor.

30 Claims, 40 Drawing Sheets

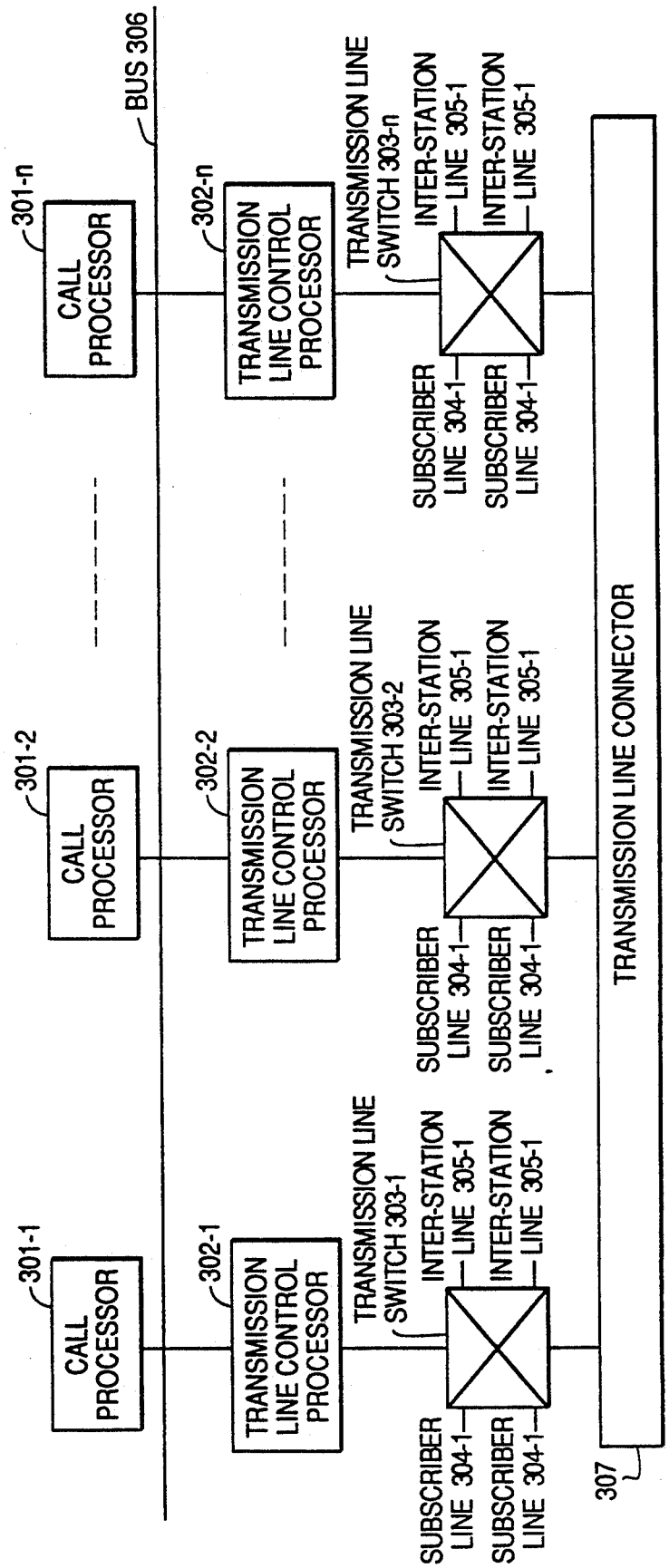

FIG. 20

| ABBRE-VIATION | MEANINGS |
|---|---|
| Vav | AVERAGE SPEED (REQUESTED VALUE) |
| Vp | MAXIMUM SPEED (REQUESTED VALUE) |
| Nc | NUMBER OF CELLS GENERATED DURING THE BURSTING PERIOD |
| V | DISTRIBUTION OF CELL TRAFFIC |
| A | AVERAGE CELL TRAFFIC |
| Vt | MAXIMUM TRANSMISSION SPEED OF A LINK |
| Vpts | SUM OF MAXIMUM SPEEDS OF ALL CALLS BEING COMMUNICATED |
| Vpht | SUM OF MAXIMUM SPEEDS OF ALL CALLS ASSIGNED AT THE MAXIMUM SPEED |
| Vavt | SUM OF AVERAGE SPEEDS OF ALL CALLS ASSIGNED AT AN AVERAGE SPEED |
| X | A CONSTANT |
| ρmax | A CONSTANT |

FIG. 22

| NAME OF LINK | LOGICALLY AVAILABLE BAND | NAME OF LINK | LOGICALLY AVAILABLE BAND |
|---|---|---|---|
| L111 | 700 Kbps | L211 | 500 Kbps |
| L112 | 11600 Kbps | L212 | 11600 Kbps |
| L113 | 700 Kbps | L213 | 700 Kbps |
| L121 | 800 Kbps | L221 | 800 Kbps |
| L122 | 900 Kbps | L222 | 900 Kbps |
| L123 | 1000 Kbps | L223 | 1000 Kbps |
| L131 | 11500 Kbps | L231 | 11500 Kbps |
| L132 | 12500 Kbps | L232 | 12500 Kbps |
| L133 | 500 Kbps | L233 | 500 Kbps |

FIG. 23

| NAME OF LINK | LOGICALLY AVAILABLE BAND | NAME OF LINK | LOGICALLY AVAILABLE BAND |
|---|---|---|---|
| L111 | 700 Kbps | L211 | 500 Kbps |
| L112 | 11600 Kbps | L212 | 11600 Kbps |
| L113 | 40700 Kbps | L213 | 700 Kbps |
| L121 | 800 Kbps | L221 | 800 Kbps |
| L122 | 900 Kbps | L222 | 900 Kbps |
| L123 | 1000 Kbps | L223 | 1000 Kbps |
| L131 | 11500 Kbps | L231 | 11500 Kbps |
| L132 | 12500 Kbps | L232 | 12500 Kbps |
| L133 | 500 Kbps | L233 | 40500 Kbps |

FIG. 24

| CONNECTION ID | NAME OF PRIMARY LINK | NAME OF SECONDARY LINK | AVAILABLE BAND |
|---|---|---|---|
| 100 | L113 | L233 | 40000 Kbps |

| NAME OF LINK | AVAILABLE BAND |
|---|---|
| L113 | 599300 Kbps |
| L111 | 599200 Kbps |
| L112 | 588400 Kbps |
| L121 | 599200 Kbps |
| L122 | 599100 Kbps |
| L123 | 599000 Kbps |
| L133 | 599500 Kbps |
| L131 | 588500 Kbps |
| L132 | 587500 Kbps |

| NAME OF LINK | USAGE RATE OF BUFFER | NAME OF LINK | USAGE RATE OF BUFFER |
|---|---|---|---|
| L111 | 70% | L211 | 30% |
| ∫ | | ∫ | |
| L11M | 50% | L21P | 60% |
| ∫ | | ∫ | |
| L1M | 30% | L2MP | 80% |

FIG. 38A

| NUMBER OF SWITCH IN THE FIRST STEP | LOAD STATE BIT DATA OF EACH OUTPUT LINK | | | | | |
|---|---|---|---|---|---|---|
| | 1 | 2 | 3 | | M-1 | M |
| $S_{11}$ | 0 | 0 | 0 | | 0 | 0 |
| $S_{12}$ | 0 | 1 | 0 | | 0 | 0 |
| | | | | | | |
| $S_{1i}$ | 0 | 1 | 0 | | 0 | 0 |
| | | | | | | |
| $S_{1KL}$ | 1 | 1 | 1 | | 0 | 0 |

← NUMBER OF OUTPUT LINK

FIG. 38B

| NUMBER OF SWITCH IN THE THIRD STEP | LOAD STATE BIT DATA OF EACH INPUT LINK | | | | | |
|---|---|---|---|---|---|---|
| | 1 | 2 | 3 | | M-1 | M |
| $S_{31}$ | 0 | 0 | 0 | | 0 | 0 |
| $S_{32}$ | 0 | 1 | 0 | | 0 | 0 |
| | | | | | | |
| $S_{3k}$ | 0 | 1 | 0 | | 0 | 0 |
| | | | | | | |
| $S_{3P}$ | 1 | 1 | 1 | | 0 | 0 |

← NUMBER OF INPUT LINK

FIG. 42

| NAME OF LINK | USAGE RATE OF BUFFER | NAME OF LINK | USAGE RATE OF BUFFER |
|---|---|---|---|
| $L_{111}$ | 20% | $L_{211}$ | 10% |
| $L_{112}$ | 60% | $L_{212}$ | 60% |
| $L_{113}$ | 20% | $L_{213}$ | 20% |
| $L_{121}$ | 30% | $L_{221}$ | 30% |
| $L_{122}$ | 40% | $L_{222}$ | 40% |
| $L_{123}$ | 50% | $L_{223}$ | 50% |
| $L_{131}$ | 55% | $L_{231}$ | 55% |
| $L_{132}$ | 58% | $L_{232}$ | 58% |
| $L_{133}$ | 10% | $L_{223}$ | 10% |

FIG. 43A

| SWITCH NO. IN THE FIRST STEP | LOAD STATE BIT DATA | | |
|---|---|---|---|
| | 1 | 2 | 3 |
| $S_{11}$ | 0 | 0 | 0 |
| $S_{12}$ | 0 | 1 | 0 |
| $S_{13}$ | 1 | 0 | 0 |

FIG. 43B

| SWITCH NO. IN THE THIRD STEP | LOAD STATE BIT DATA | | |
|---|---|---|---|
| | 1 | 2 | 3 |
| $S_{31}$ | 0 | 0 | 0 |
| $S_{32}$ | 0 | 1 | 0 |
| $S_{33}$ | 0 | 0 | 1 |

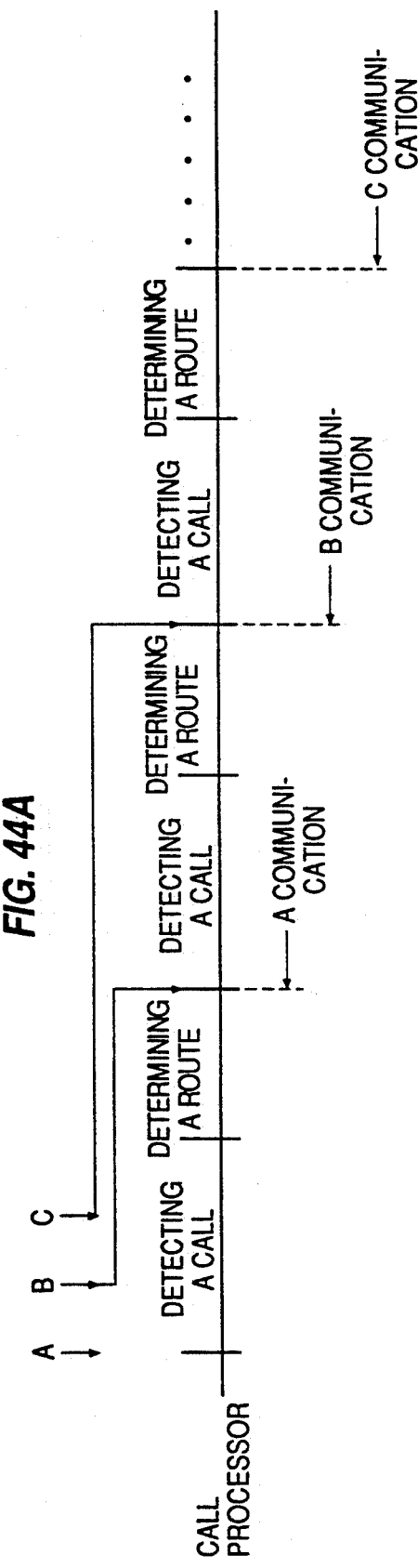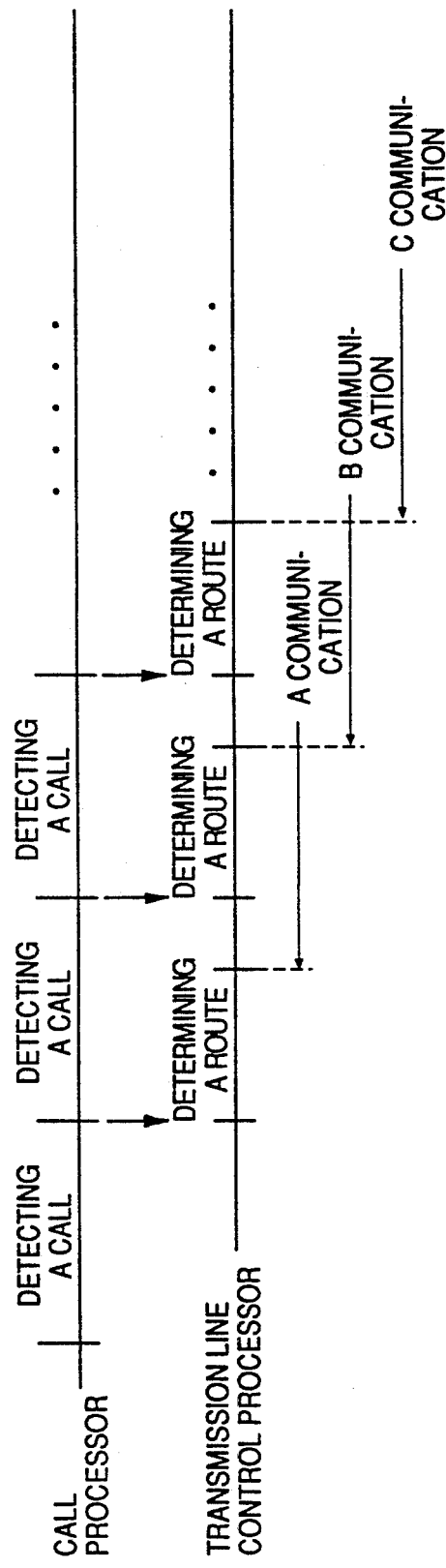

ATM SWITCHING UNIT

BACKGROUND OF THE INVENTION

The present invention relates to a system configuration and a control method of an asynchronous transmission mode (ATM) switching unit.

Since ATM switching technology is recognized as a switching method of a new generation by the International Telegraph and Telephone Consultative Committee (CCITT), research and development in this technology is being conducted by many organizations to realize a broadband integrated service digital network (ISDN).

In ATM communication, various kinds of traffic such as voice, data, and animation each having a different bearer speed and burst property are controlled collectively. Accordingly, there are problems in that the control of transmission lines be comes necessarily complicated, and that it takes much more time to set calls in the ATM switching unit than in a current switching unit. Besides, the resources of existing switching units (software) must be taken over efficiently by the new technology.

An example of the prior art technology in contrast with the present invention is a switching method utilized in a synchronous transmission mode (STM). FIG. 1 shows a general view for explaining an STM switching method.

An STM switching method is a time-divisional multiplexing method associated with frame synchronization. In this method, each interval, called a frame, has a time length of 125 $\mu$s and is divided into a plurality of time slots of fixed length. Then, channel data corresponding to each user is divided and multiplexed at each position of a time slot.

In FIG. 1, on the receiving side, each of four channel data indicated by A, B, C1, and C2 is multiplexed by a switch SW1 each fixed length in a time divisional manner. On the sending side, the multiplexed data are separated by a switch SW2 which is operated synchronously with the switch SW1. Setting the number of frames based on data volume enables the transmission of a required volume of data in each channel.

As described above, in the conventional STM switching method, each medium, such as voice, data, animation, etc., is assigned automatically and physically a fixed band of a line. Therefore, the STM switching unit can control the transmission line only by physically determining the free/busy state of the input and output of the switch, and the control can be performed quite easily. Such control of the transmission line can be realized as executed by a call processor according to a call processing software (program).

FIG. 2 shows a general view for explaining an ATM switching method associated with the present invention. In the ATM switching method, information of each channel is divided into short blocks. A header is added at the head of each block to be transmitted sequentially. A block with a header is called "a cell". The ATM switching unit enables high speed switching and transmission to a correspondent in a unit of a cell by identifying the contents of a header of each cell using hardware capabilities. In the above described switching method, various kinds of traffic such as voice, data, animation, etc. each having a different bearer speed and burst property can be transmitted collectively.

The ATM switching unit manages bands taking bearer speed and burst property of information into account. Therefore, in the ATM switching unit, the management of the resources of switches in the transmission line becomes complicated when calculating the discard rate, delay time, etc. In the ATM switching unit, a high level of resource management in which one route is selected promptly from among a plurality of switching routes leading in the same output direction is indispensable for distributing a traffic load in a switch and for increasing use efficiency of each switch in the switching unit as much a possible.

Accordingly, such management can be performed by a call processor similar to that in a conventional STM switching unit taking a very long time, thereby causing degradation of the quality of services.

However, there are problems with the ATM switching unit in that the configuration of a transmission switch (ATM switch) is different from that of a switch in a conventional STM switching unit; and in that current call processing software must be modified on a large scale to realize the transmission line control process successfully on a call processor side because the ATM switching unit has different realizing methods and different switch controlling methods.

A similar problem occurs when a large scale ATM switching unit is realized.

Furthermore, in the above described transmission line control method, a unit cannot be extended easily as desired.

SUMMARY OF THE INVENTION

The present invention has been developed based on the above described background to enable a high speed setting of routes, etc. It permits a reduction in the modification of existing calling software for various ATM switches, and aims at extending the scale of an ATM switching system.

The first aspect of the present invention relates to an ATM switching unit comprising a transmission line switch in the asynchronous transmission mode.

Thus, the ATM switching unit comprises a call processor for controlling signals and various services.

It further comprises a transmission control processor for controlling a transmission line of a transmission line switch at a request of a call processor.

According to the first aspect of the present invention, the resource management specific to the ATM switching unit is distributed to a transmission line control processor different from a call processor, thus enabling a high speed process.

Additionally, a process specific to the ATM transmission line switch is distributed to a program module for a transmission line control processor which is different from a call program for a call processor, thereby increasing use efficiency of the existing calling software.

The second aspect of the present invention relates to an ATM switching unit having a configuration in which a plurality of transmission line switches in the asynchronous transmission mode are connected through a transmission line connector.

The ATM switching unit comprises a plurality of call processors for controlling signals and various services for each transmission line switch.

It further comprises a plurality of transmission line control processors for controlling, at a request of each call processor, a transmission line of each transmission line switch.

It still further comprises a bus for connecting each call processor to a corresponding transmission line control processor.

According to the second aspect of the present invention, in a configuration having a plurality of transmission line switches, a switching system can be easily extended by adding any number of units each comprising a call processor and a transmission line control processor to each transmission line switch.

The third aspect of the present invention relates to an ATM switching unit having a configuration in which a plurality of transmission line switches in the asynchronous transmission mode are connected through a transmission line connector.

The ATM switching unit comprises a plurality of call processors for controlling signals and various services for each transmission line switch.

It further comprises a plurality of transmission line control processors for controlling, at a request of each call processor, a transmission line of each transmission line switch.

It still further comprises a shared memory for storing information indicating an available band of an output line of each transmission line switch.

It still further comprises a bus for connecting each call processor, transmission line control processor, and a shared memory.

According to the third aspect of the present invention, in which a shared memory is provided for storing information indicating an available band of an output line of each transmission line switch, each call processor need not ask each transmission line control processor for an available band of an output line of each transmission line switch, thereby enabling a higher speed process than in the second aspect of the present invention.

The fourth aspect of the present invention relates to an ATM switching unit.

Switching modules comprising a plurality of input links and a plurality of output links are located in the form of a matrix where each input highway, that is, an input to an ATM switching unit, is connected to each switching module in the first step; each output highway, that is, an output from the ATM switching unit, is connected to each switching module in the last step; and each switching module between the first and the last step modules is connected to a link from every module in the previous step in each row, thus forming a transmission line switch.

The ATM switching unit comprises a call processor for outputting a call connection request containing the information of an input highway, an output highway, and a requested available band.

It further comprises a route selector for selecting a route in a transmission line switch connecting an input highway and an output highway specified by a call connection request.

It still further comprises a call admission determiner for determining whether or not a call corresponding to a call connection request is admitted through a route selected by the route selector according to the information of an available band of a call specified by a call connection request.

According to the fourth aspect of the present invention, the optimum route can be selected in a transmission line switch depending on an available band, a load state, etc. by a route selector and a call admission determiner.

The route selector and a call reception determiner are provided in a transmission line control processor for controlling a transmission line of a transmission line switch. As a result, the basic configuration of the fourth aspect of the present invention is the same as that of the above described first and other aspects of the present invention.

BRIEF DESCRIPTION OF THE DRAWINGS

Other objects and features of the present invention can be easily recognized in the principle description and explanation of preferred embodiments in association with the attached drawings.

FIG. 3A, 3B, 3C, and 3D show a principle configuration of the present invention;

FIG. 20 shows a list of abbreviations for use in the call reception determining process in the fourth embodiment;

FIG. 22 shows examples of contents of an intraswitch logically available band data base before an update process the fourth embodiment;

FIG. 23 shows examples of contents of an intraswitch logically available band data base after an update process in the fourth embodiment;

FIG. 24 shows examples of contents of routing information storage table for each connection after an update process in the fourth embodiment;

FIGS. 38A and 38B show examples of contents of an intra-switch load information data base in the tenth embodiment;

FIG. 42 shows examples of information of request calls in the eleventh embodiment;

FIGS. 43A and 43B show examples of contents of a data base for storing actual data in a link in the eleventh embodiment; and FIGS. 44A and 44B show views for explaining the effect of the present invention.

DESCRIPTION OF THE PREFERRED EMBODIMENTS

Figure 1:
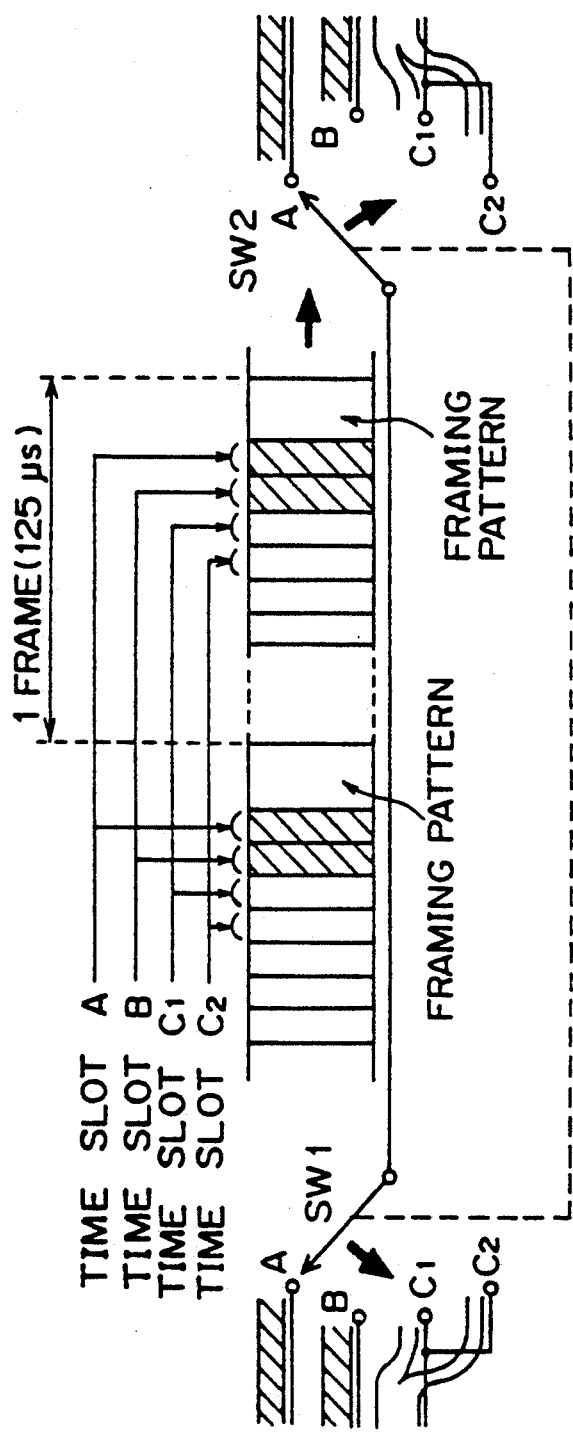
FIG. 1 shows a general view for explaining the STM method.
Figure 2:
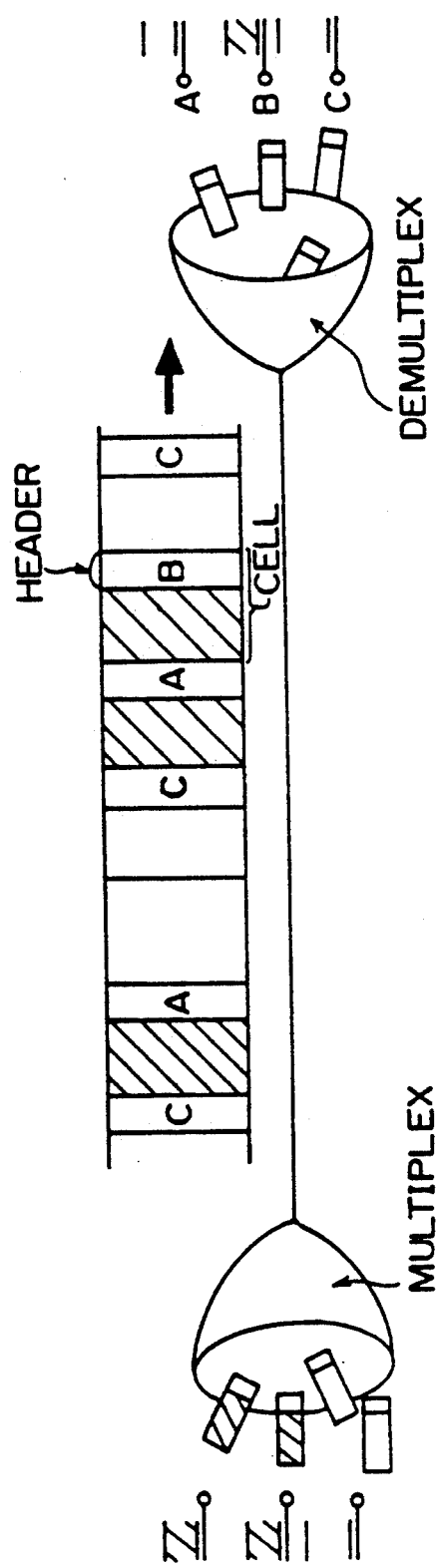
FIG. 2 shows a general view for explaining the ATM method.
Figure 3A:
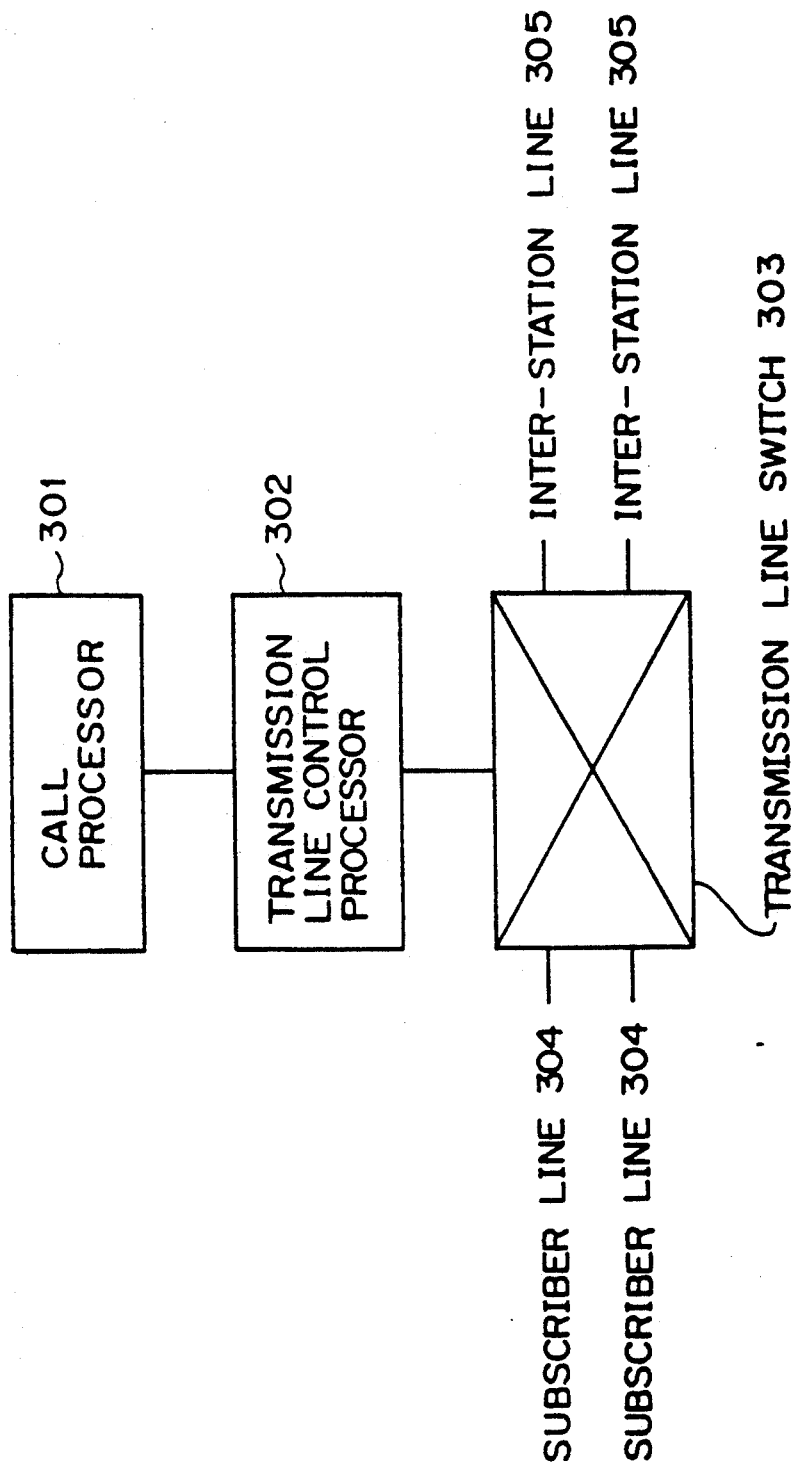

FIG. 3A shows a principle configuration of the first aspect of the present invention. The first aspect relates to an ATM switching unit comprising a transmission line switch 303 in the asynchronous transmission mode.

A call processor 301 controls signals and various kinds of services.

A transmission line control processor 302 controls a transmission line of a transmission switch 303 at a request of the call processor 301. The transmission line control processor 302 comprises a subscriber line manager for managing the resources of a subscriber line 304 accommodated in the transmission line switch 303 at a request of the cell processor 301, an inter-station line manager for managing the resources of an inter-station line 305 accommodated in the transmission line switch 303 at a request of the call processor 301, and a path controller for connection-controlling a path by the transmission line switch 303 at a request of the call processor 301.

In the first aspect described above, the call processor 301 outputs to the transmission line control processor 302 only requests for capture, allotment, and release of a line, and for a reservation, connection, and disconnection of a path. The complicated control of transmission lines (for example, calculation of a band of a line) is performed by the transmission line control processor 302 according to these requests. Thus, the resources of the ATM switching unit are managed at a high speed by distributing the process to another transmission line control processor 302 which is different from the call processor 301.

The existing call processing software can be used effectively by distributing a process specific to an ATM transmission line switch to another program module for the transmission line control processor 302 different from a processing program for the call processor 301.

Next, FIG. 3B shows a principle configuration of the second aspect of the present invention. The second aspect relates to an ATM switching unit having a configuration in which a plurality of transmission line switches 303-1–303-n in the asynchronous transmission mode are connected by a transmission line connector 307.

As indicated by subscripts "–1"–"–n" assigned to the numbers of configuration parts, the configuration shown in FIG. 3B comprises a plurality of sets (n sets, where n can be any natural number) of configurations of the first aspect shown in FIG. 3A, each set being connected to another set. In this case, call processors 301-1–301-n and transmission line control processors 302-1–302-n are connected to each other through a bus 306.

Each of the call processors 301-1–301-n comprises a portion in which the optimum output line can be selected after asking the transmission line control processors 302-1–302-n for the available band of the output line of the transmission line switches 303-1–303-n; and a portion in which the communication is made to and from another call processor.

Each of transmission line control processors 302-1–302-n comprises, in addition to the subscriber line manager, an inter-station line manager and a path controller, each described in the first aspect, and a transmission line connection manager for managing the resources of the transmission line connector 307 at a request of the corresponding call processor.

In the configuration of the second aspect described above, when a plurality of transmission line switches are provided, a set comprising a call processor and a transmission line control processor provided for each transmission switch easily permits the extension of a switching system according to the number of additional sets.

Figure 3C:
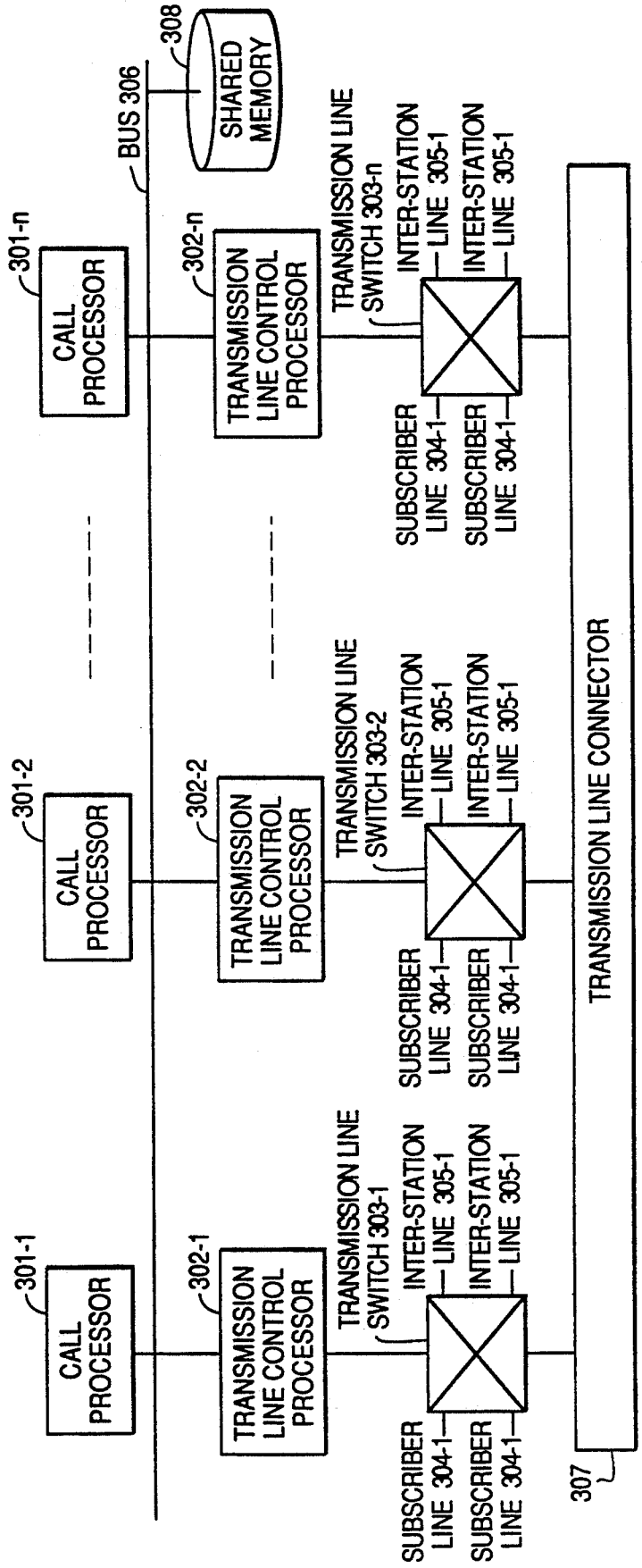

FIG. 3C shows a principle configuration of the third aspect of the present invention. The third aspect has, in addition to the configuration of the second aspect shown in FIG. 3B, a configuration in which a shared memory 308 for storing the information of available bands of an output line of each of transmission line switches 303-1–303-n is connected to the bus 306.

In this case, the call processors 301-1–301-n do not ask the transmission line control processors 302-1–302-n as in the second aspect, but the above described shared memory 308 for the available bands of the output lines of the transmission switches 303-1–303-n.

In the configuration of the third aspect described above, the call processors 301-1–301-n need not ask the transmission line control processors 302-1–302-n for the available bands of the output line of each of the transmission switches 303-1–303-n every time they use it by providing, in the second aspect described above, the shared memory 308 for storing information indicating the available bands of the output line of each of the transmission line switches 303-1–303-n. Thus, the process is performed at a higher speed than in the second aspect.

Figure 3D:
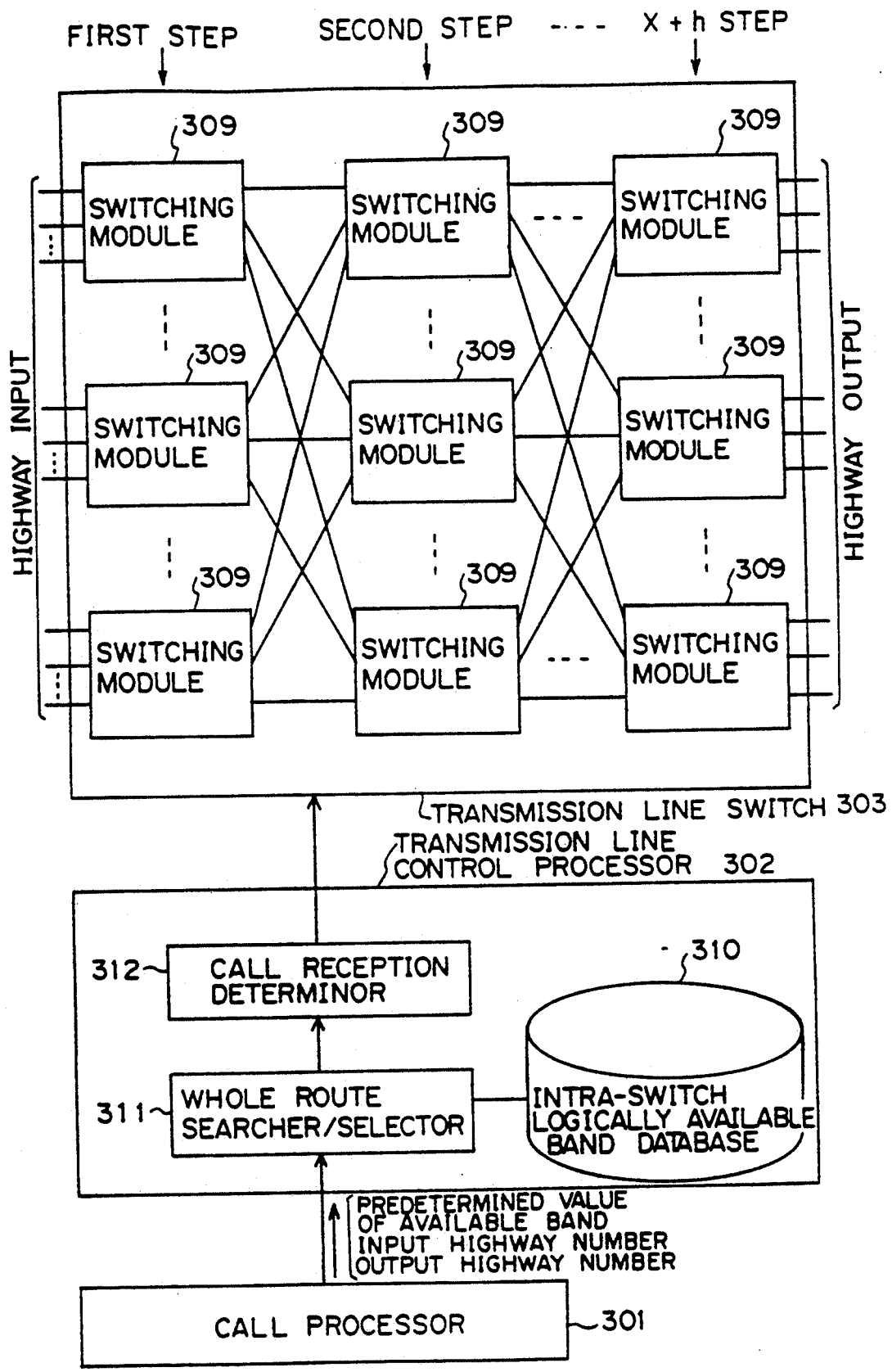

FIG. 3D shows a principle configuration of the fourth aspect of the present invention.

The first-third aspects described above disclose a general configuration in which the resources specific to the ATM switching unit are managed by the transmission line control processor 302, not by the call processor 301. By contrast, the fourth aspect of the present invention discloses a technology in which the transmission line switch 303 controls the connection of a path at a request for a path connection from the call processor 301 based on the premise of the configuration indicated in the first-third aspects.

The general configuration of FIG. 3D is the same as that of the first aspect shown in FIG. 3A. This can be extended to have the same configuration as that indicated in the second aspect shown in FIG. 3B or in the third aspect shown in FIG. 3C.

In FIG. 3D, The transmission line switch 303 is configured such that switching modules 309 provided with a plurality of highway input parts and a plurality of highway output parts are located in the form of a matrix. Each of the switching modules 309 at each step (1st-Xth) is connected to each of the preceding and following steps. However, a switching module in the first (1st) step is connected only to each of the switching modules in the following (2nd) step, while a switching module in the last (Xth) step is connected only to each of the switching modules in the preceding (Xth) step. Therefore, the transmission line switch 303 has a plurality of output routes in one direction.

In issuing a path connection request, the call processor 301 gives information of a predetermined value of an available band, an input highway number (number of subscriber or inter-station line toward a sending terminal), and an output highway number (number of subscriber or inter-station lines toward a receiving terminal).

A path connection controller in the transmission line control processor 302 comprises an intra-switch logically available band data base 310, a whole route searcher/selector 311, and a call admission determiner 312.

The intra-switch logically available band data base 310 stores usage rate information of each of the switching modules 309 in the transmission switch 10 and stores information of an available space rate. This function can be performed by an external storage unit connected to the transmission line control processor 302.

On receiving a path connection request from the call processor 301, the whole route searcher/selector 311 determines a route (path) in the transmission line switch 303 by referring to the intra-switch logically available band data base 310. That is, when the call processor 301 outputs the information of available bands, input highway number, output highway number, etc., the whole route searcher/selector 311 in the transmission line control processor 302 selects, after referring to the intra-switch logically available band data base 310, the route having the smallest possibility of congestion, that is, the smallest usage rate of all routes from the input highway to the output highway specified by the transmission line switch 303

The call admission determiner 312 determines whether or not a call requested by a user is acceptable through a route determined by the whole route searcher/selector 311.

As described above, in the fourth aspect of the present invention, a route in the transmission line switch 303 can be selected promptly and the possibility of congestion in each switching module 309 in the transmission line switch can be minimized by distributing the process by the transmission line control processor 302.

As described above, a call detecting process by the call processor 301 and a route selecting process by the transmission line control processor 302 are performed concurrently.

Thus, it takes a longer time for a subscriber to actually communicate with a correspondent conventionally because, as shown in FIG. 44A, a call processor detects a call and a route sequentially for each of subscribers A, B, and C who issue a call.

However, in the present invention, a call processor only detects a call for each of subscribers A, B, and C who issue a call as shown in FIG. 44B, and a route detecting process is performed exclusively by the transmission line control processor 302. Thus, the time period required for enabling actual communication of each subscriber can be shortened considerably.

The 1st Embodiment

Figure 4:
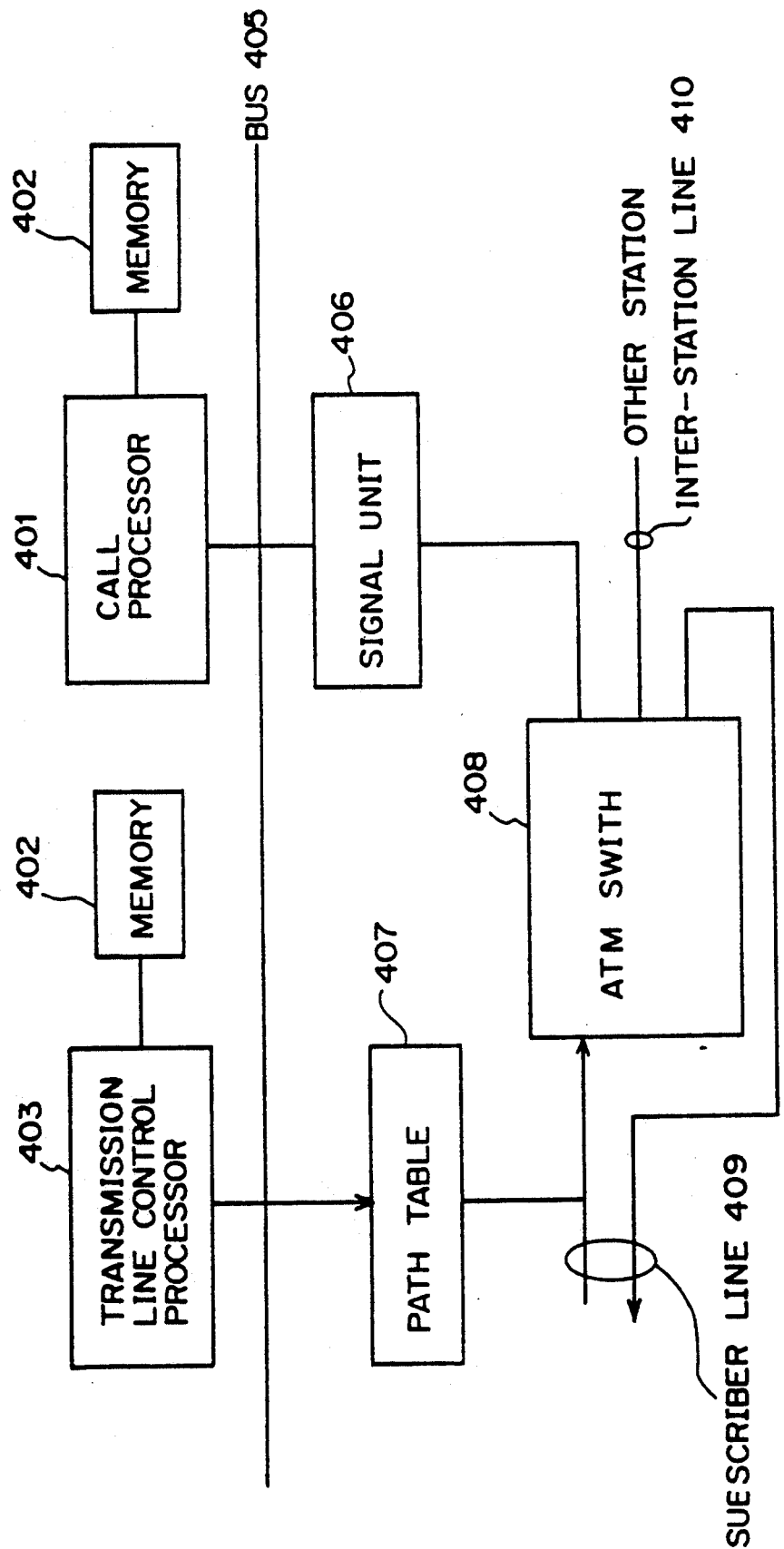
FIG. 4 shows a configuration of the first embodiment of the present invention.

FIG. 4 shows a configuration of the first embodiment reflecting the first aspect of the present invention.

A call processor 401 uses a memory 402 to control signals and various kinds of services.

A transmission line control processor 403 performs complicated calculation on available bands using a memory 404 to efficiently send various information of various media through an ATM switch 408.

A signal unit 406 processes a signal inputted/outputted to a terminal (not shown in FIG. 4) through a subscriber line 409 and an ATM switch 408.

A path table 407 stores switching information for an ATM switch 408 between a subscriber line 409 and an inter-station line 410 to be connected to another station.

The call processor 401, transmission line control processor 403, signal unit 406, and path table 407 are connected to one another through the bus 405.

Figure 5:
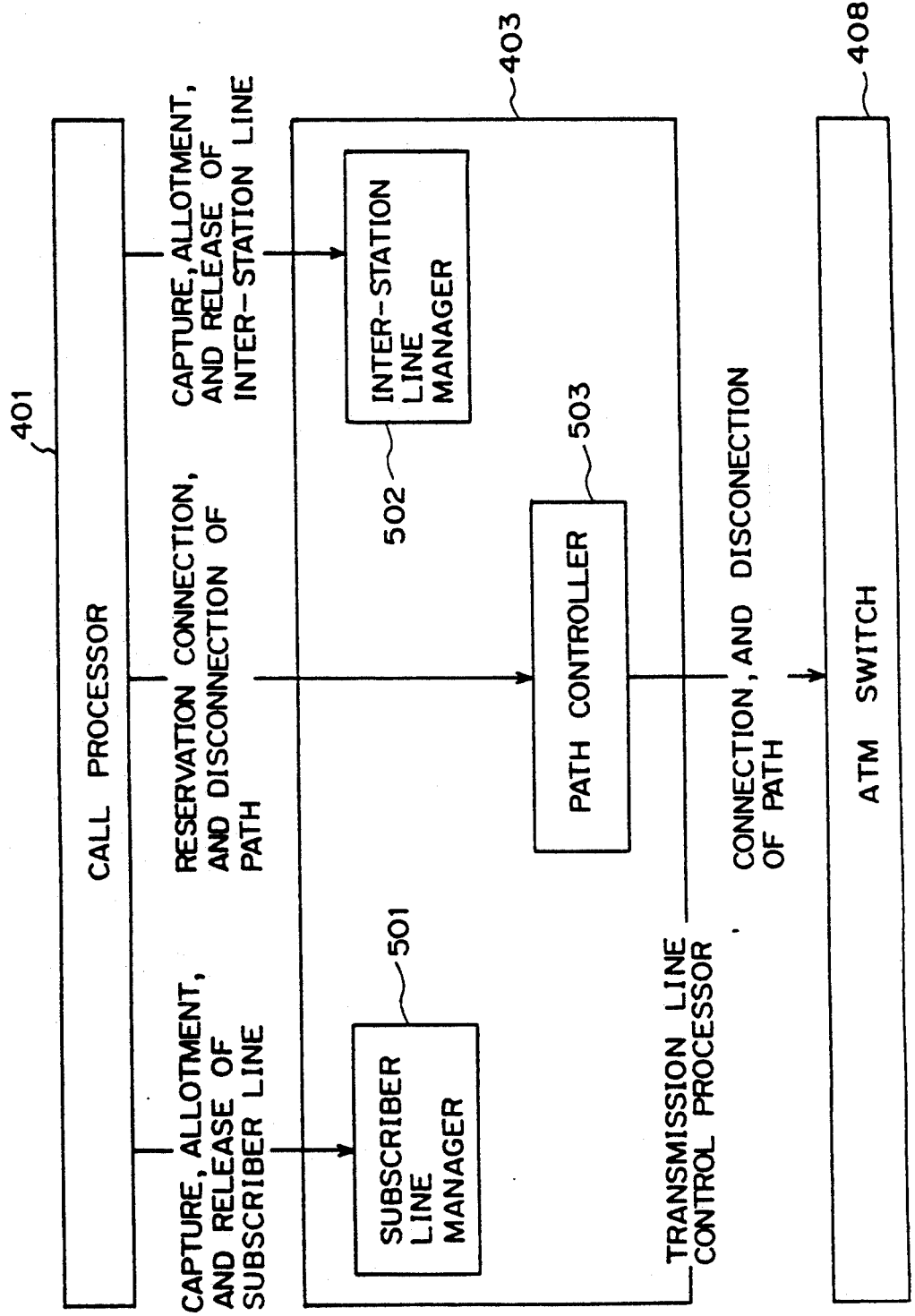
FIG. 5 shows a functional block diagram of the first embodiment.

FIG. 5 shows a functional block diagram centering on the transmission line control processor 403 and corresponds to the first embodiment shown in FIG. 4. In the transmission line control processor 403, a subscriber line manager 501 analytically manages the resources of the subscriber line 409 shown in FIG. 4 (the calculation of call discard rate, delay time, etc.), and performs necessary processes at various requests of the call processor 401 such as capture, allotment, and release of a subscriber line. An inter-station line manager 502 analytically manages the resources of the interstation line 410 and performs necessary processes on various requests from the call processor 401 such as capture, allotment, and release of an inter-station line. A path controller 503 performs necessary processes on various requests of the call processor 401 such as a reservation, connection, and disconnection of a path, and instructs the ATM switch 408 to connect/disconnect a path according to the results of the above described processes.

Figure 6:
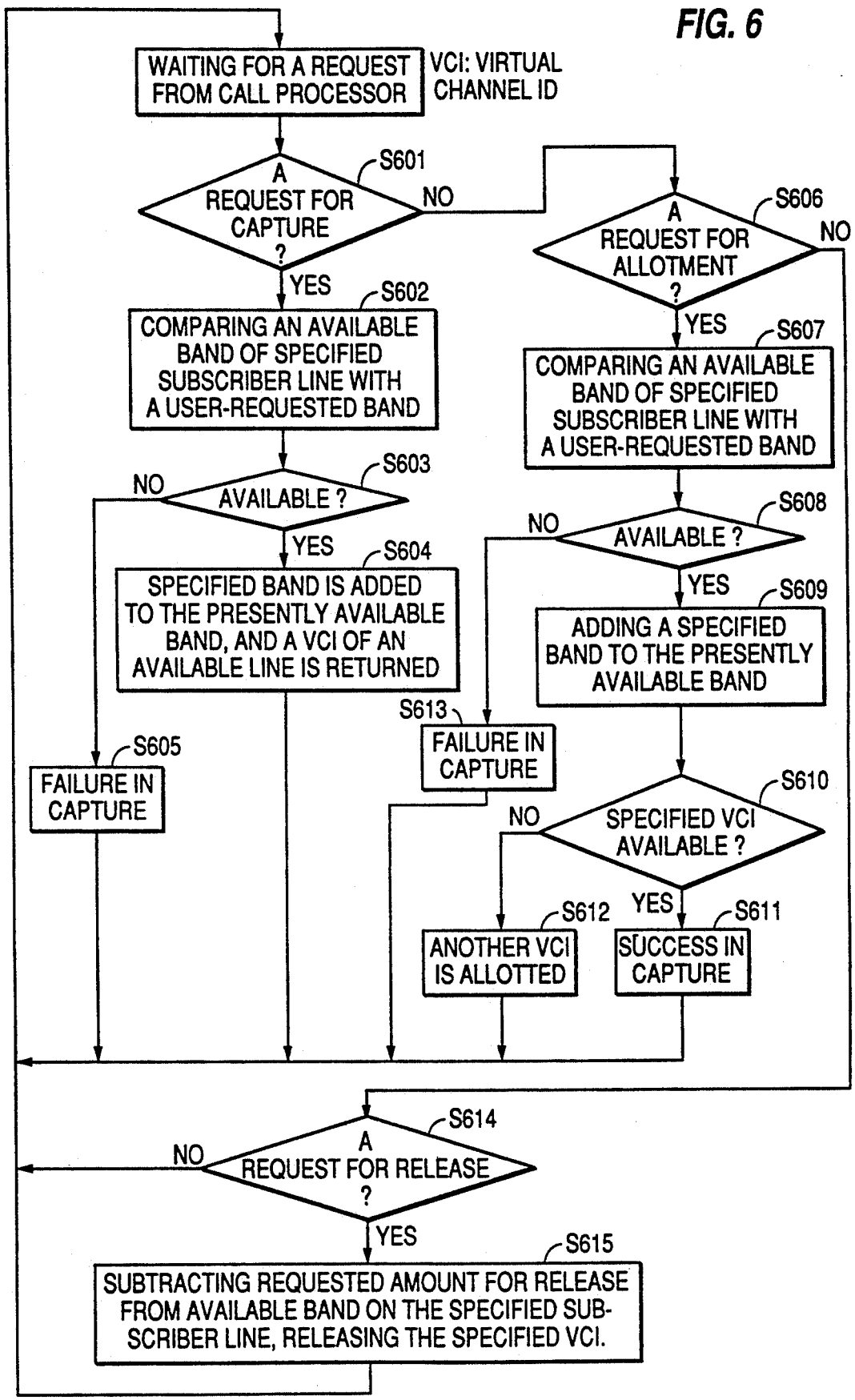
FIG. 6 shows an operational flowchart of a subscriber line manager in the first embodiment.

FIG. 6 shows an operational flowchart of a function realization of the subscriber line manager 501 shown in FIG. 5, and the function is realized as executed by the transmission line control processor according to a program stored in the memory 404 shown in FIG. 4.

First, a determination is made as to whether or not the call processor 401 asks for capture of the subscriber line 409 (S601).

If it asks for capture (if the determination S601 is "yes"), the following steps S602–S605 are performed. "Capture of the subscriber line 409" means a process for reserving a band of the subscriber line 409 based on a call from a terminal.

First, the capacity of available bands of the specified subscriber line 409 is compared with the band requested by the user (S602).

As a result, when the specified subscriber line 409 is available (if determination S603 is "yes"), the specified band is added to the currently available band, and an available virtual channel identifier (VCI) is returned to the call processor 401 (S604). Information of the band of the subscriber line 409, VCI, etc. is stored in the memory 404 shown in FIG. 4.

If all subscriber lines 409 are busy (if determination S603 is "no"), the call processor 401 is informed of the capture failure (S605), and the call processor informs the subscriber of the rejection of the call reception.

Next, if the request from the call processor 401 does not relate to the capture of the subscriber line 409 (determination S601 is "no") but to allotment of the subscriber line 409 (determination S606 is "yes"), the following processes S607–S613 are performed. The allotment of the subscriber 409 means a process of reserving a corresponding band of the subscriber 409 at a request a communicating terminal for another VCI.

First, an available band of the specified subscriber line 409 is compared with the band requested by a user (S607).

As a result, when the specified subscriber line 409 is available (determination S608 is "yes"), the specified band is added to the currently available band (S609).

Then, determination is made as to whether or not the specified VCI is available (S610). If "yes" (available), the VCI is allotted (successful capture S611); and if "no", another VCI is allotted (S612).

On the other hand, when the specified subscriber line 409 is not available (determination S608 is "no"), the call processor 401 is informed of the failure in capture (S613), and the call processor informs the subscriber of the rejection of the call reception.

If a request of the call processor 401 relates to neither capture nor allotment of the subscriber line 409 (determination S601 and S606 is "no") but to release of the subscriber line 409 (determination S614 is "yes"), the available band of the specified subscriber line 409 is decreased by the requested amount for release to terminate the communication of the terminal, and then the specified VCI is released (S615).

Finally, if a request from the call processor 401 is not associated with the subscriber line 409, no action is taken (determination S614 is "no").

Figure 7:
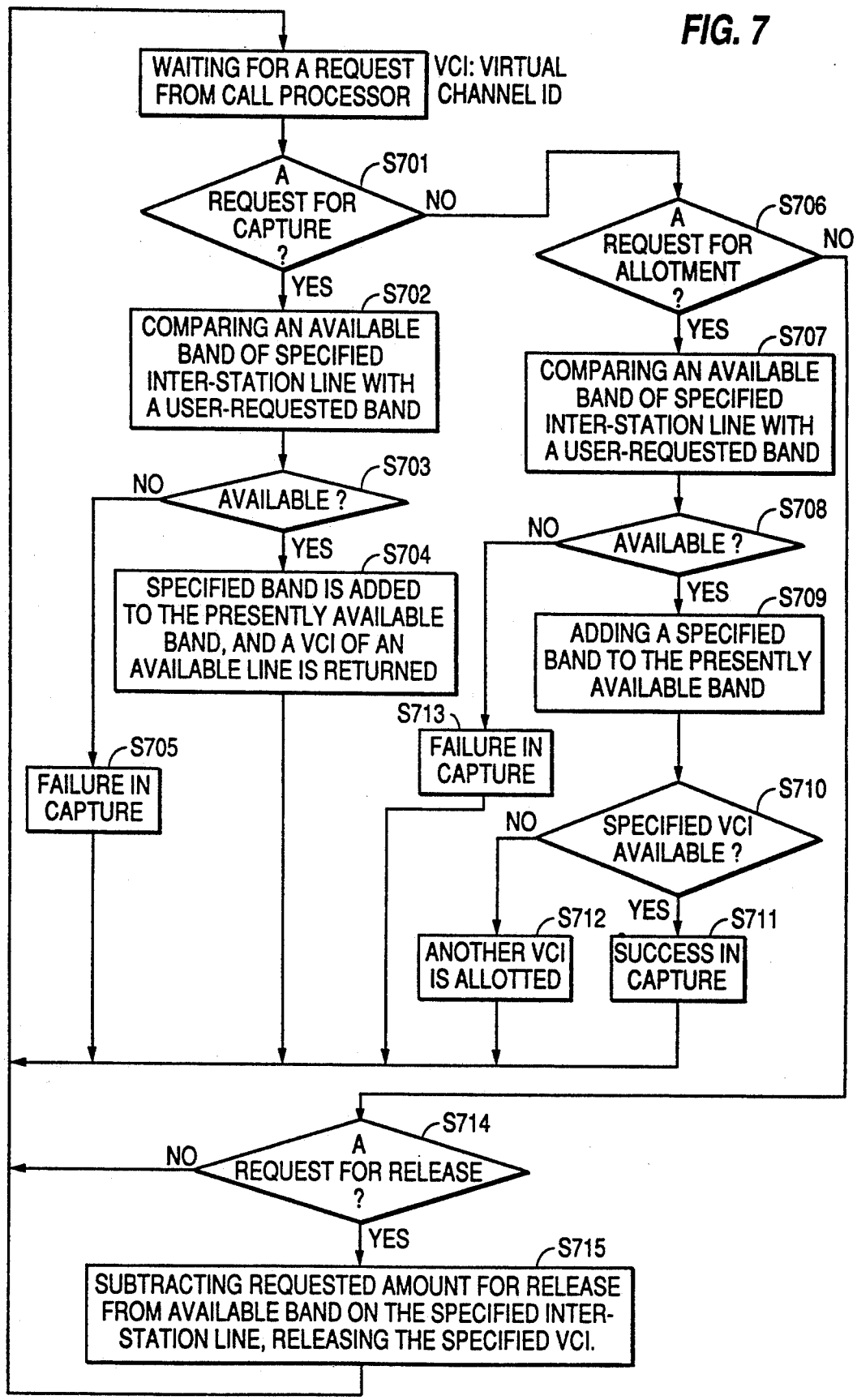
FIG. 7 shows an operational flowchart of an interstation line manager in the first embodiment.

FIG. 7 shows an operational flowchart for realizing a function of the inter-station line manager 502 shown in FIG. 5, and the function is realized as executed by the transmission line control processor 403 according to a program stored in the memory 404 shown in FIG. 4.

In this process, when a request from the call processor 401 is associated with capture, allotment, and release of the inter-station line 410 respectively, an appropriate action is taken on the interstation line 410. In this case, each of the steps S701–S715 completely correspond to the steps S601–S615 shown in FIG. 6 where the subscriber line 409 is replaced with the inter-station line 410; thereby realizing capture, allotment, or release of the inter-station line 410 at the request of the call processor 401.

Figure 8:
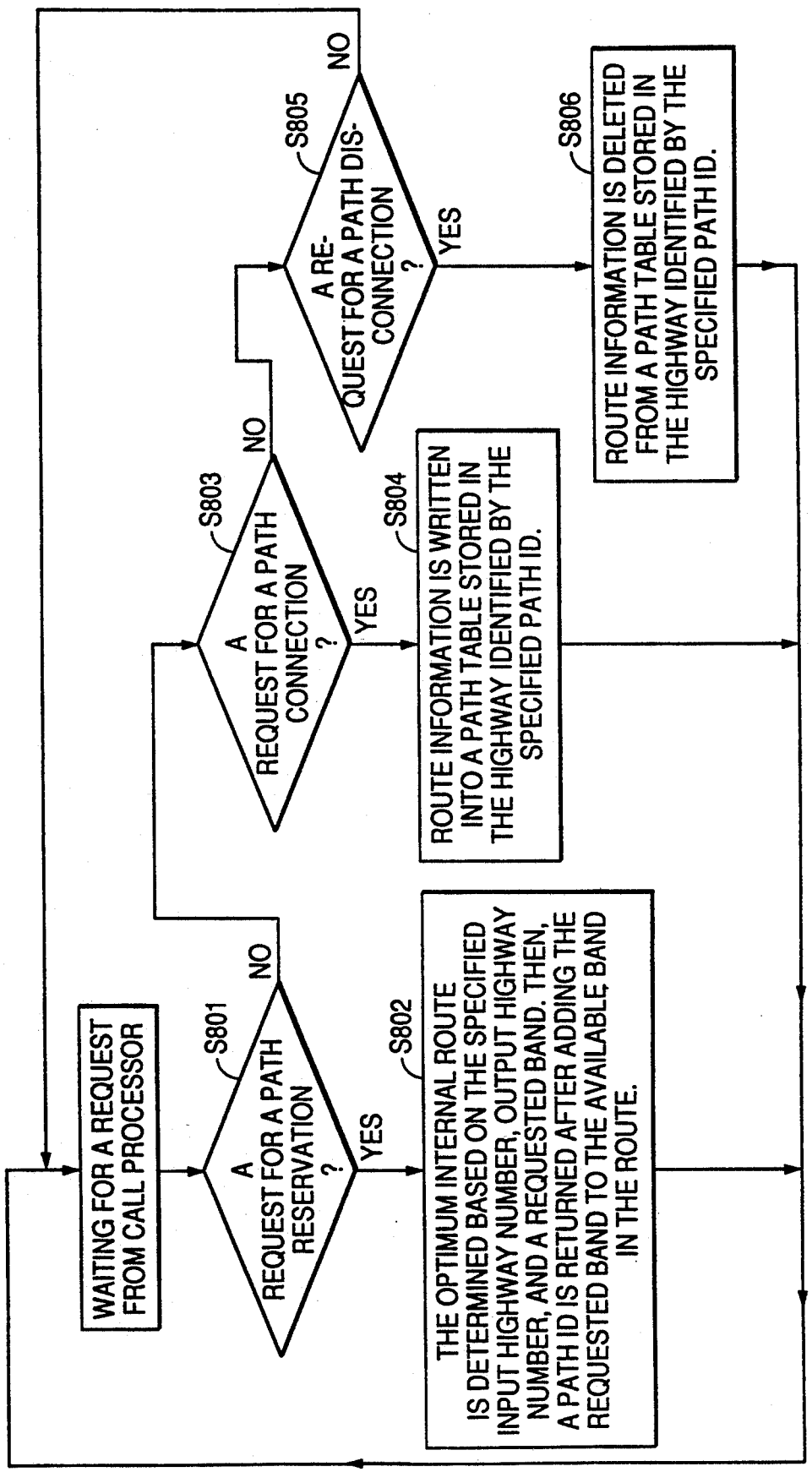
FIG. 8 shows an operational flowchart of a path controller in the first embodiment.

FIG. 8 shows an operational flowchart for realizing a function of the path controller 503 shown in FIG. 5, and the function is realized as executed by the transmission line control processor 403 according to a program stored in the memory 404 shown in FIG. 4.

A path controller 503 performs a process at a request of the call processor 401 for a reservation, connection, and disconnection of a path. A reservation of a path means a process of reserving a route in an ATM switch 408 toward the specified receiving terminal according to a call issued by a sending terminal. The connection of a path means a process of establishing a path on the ATM switch 408 as reserved above when a receiving terminal responds to the call arriving at the receiving terminal after the reservation of the path. The disconnection of a path means a process of releasing a corresponding path on the ATM switch 408 when communication is finished.

As shown in FIG. 8, determination is made as to whether or not a request of the call processor 401 is to be reserved (S801). If the path is reserved (determination S801 is "yes"), the optimum internal route of the ATM switch 408 is determined by the input highway number, the output highway number and the requested band of the specified ATM switch 408. The requested band is added to the available band in the route, and then a path ID is returned to the call processor 401 (S802). Information of each available band and path ID is stored in the memory 404 shown in FIG. 4. The input highway number and output highway number of the ATM switch 408 specified by the call processor 401 are the highway numbers of the subscriber line 409 or inter-station line 410 determined by the call processor 401's activation of either the subscriber line manager 501 or the inter-station line manager 502 shown in FIG. 5 in the transmission line control processor 403.

If a request from the call processor 401 does not relate to reservation of a path (determination S801 and S803 is "no") but to connection of a path (determination S803 is "yes"), the route information is written (S804) into the path table 407 (refer to FIG. 4) on the highway identified by the path ID specified by the call processor 401. Hereafter, communication is enabled and the user information to be applied from the sending terminal to the AT switch 408 is outputted from the ATM switch 408 to a receiving terminal.

If a request from the call processor 401 does not relate to the reservation or connection of a path (determination S801 and S803 is "no") but to disconnection of a path (determination S805 is "yes"), route information is deleted from the path table 407 on the input highway indicated by the path ID specified by the call processor 401, and the band is decreased by the amount for the deleted path from the available band on the route (S806).

Figure 9:
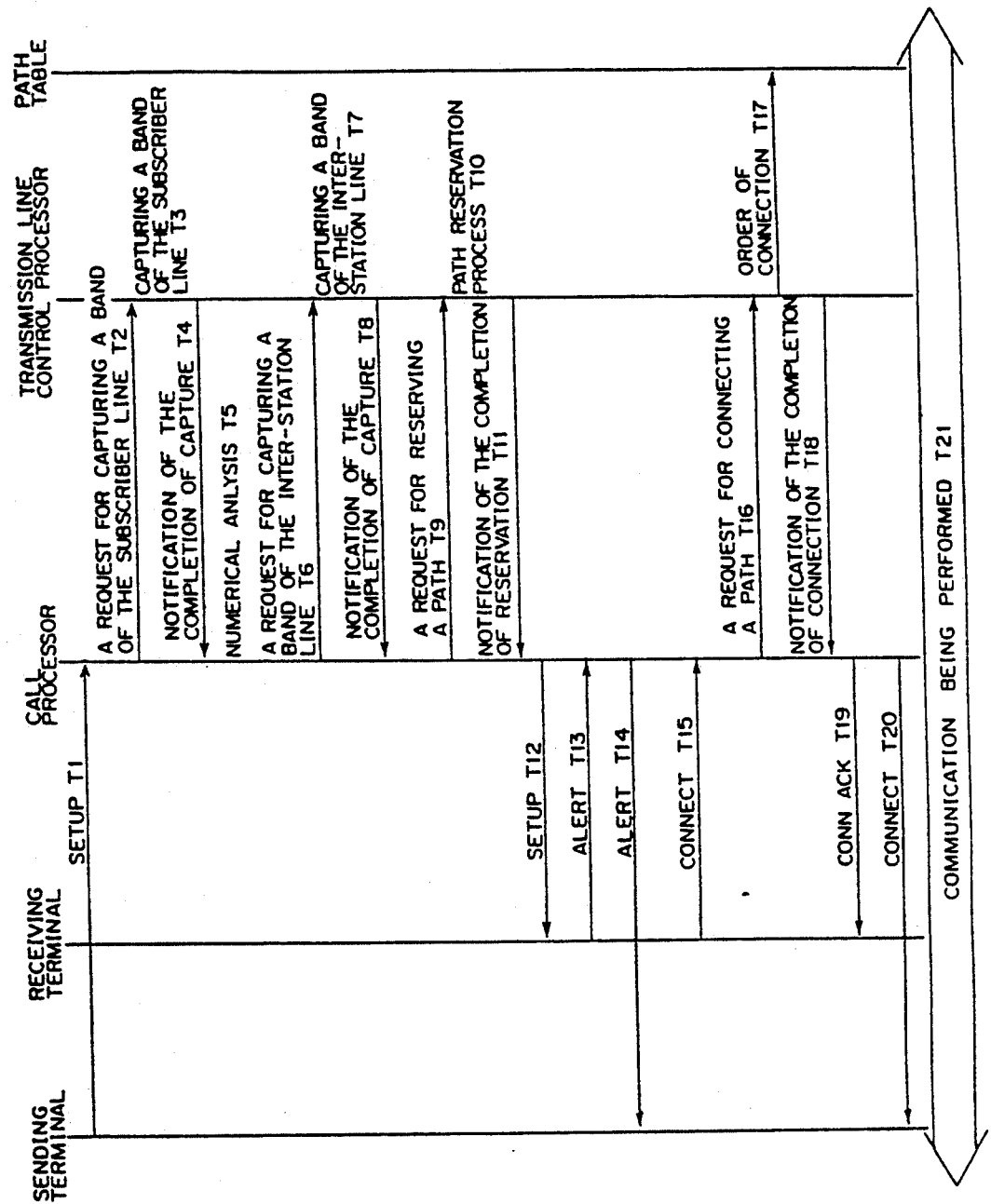
FIG. 9 shows an operational sequence in the first embodiment.

FIG. 9 shows an example of an operation of the first embodiment shown in FIG. 4 as realized according to the above described operation.

When a sending terminal issues a call, a SETUP signal is received by the signal unit 406 through the subscriber line 409 and the ATM switch 408, and is then applied to the call processor 401(T1).

Then, the call processor 401 sends a capture request (T2) of the band of the subscriber line 409 to the transmission line control processor 403; and the transmission line control processor 403 activates the subscriber line manager 501 (programs shown in FIGS. 5 and 6) and performs a process of capturing a band of the subscriber line 409 (T3). When the capture is completed, the transmission line control processor 403 notifies the call processor 401 of the completion of the capture (T4).

Then, after analyzing a dial number (numeral) from the sending terminal, the call processor 401 issues to the transmission line control processor 403 a capture request (T6) of a band of the inter-station line 410 toward the receiving terminal. Then, the transmission line control processor 403 activates the inter-station line manager 502 (programs shown in FIGS. 5 to 7)and performs a process (T7) of capturing a band of the inter-station line 410. On completing the capturing process, the transmission line control processor 403 notifies the call processor 401 of the completion of the capture (T8).

Then, on receiving a reservation request from the call processor 401 (T9), the transmission line control processor 403 activates the path controller 503 (the programs shown in FIGS. 5 and 8), thus completing a path reservation process (T10). On completion of the reservation the transmission line control processor 403 notifies the call processor 401 of the completion of the reservation (T11).

Next, the call processor 401 connects a series of calls. That is, the call processor 401 sends a SETUP signal (T12) to a receiving terminal which, in return, returns an ALERT signal (acknowledgment signal) (T14). Further, the call processor 401 sends an ALERT signal to a sending terminal (T14).

Then, in response to a CONNECT signal (connection signal) from the receiving signal to the call processor 401 (T15), the call processor 401 issues a path connection request to the transaction line control processor 403 (T16). In return, the transmission line control processor 403 activates the path controller 503 again, and connects a path for the ATM switch 408 (T17). On completion of the connection, the transmission line control processor 403 notifies the call processor 401 of the completion of the connection (T18).

Then, the call processor 401 sends a CONN ACK signal (connection acknowledge signal) to the receiving signal, and a CONNECT signal to the sending terminal (T19, T20). Hereafter, communication can be performed between the sending terminal and the receiving terminal (T21).

An example of the first embodiment is operated as described above. Other examples of its operation can be realized according to the functional block diagram shown in FIG. 5 and the operational flowchart shown in FIGS. 6-8. In this case, the call processor 401 functions in the conventional manner, but other complicated processes such as the management of available bands performed by other ATM switches 408, etc. can be distributed by the transmission line control processor 403. That is, the ATM switching unit can be controlled successfully while making most use of conventional functions of the call processor 401.

The 2nd Embodiment

Figure 10:
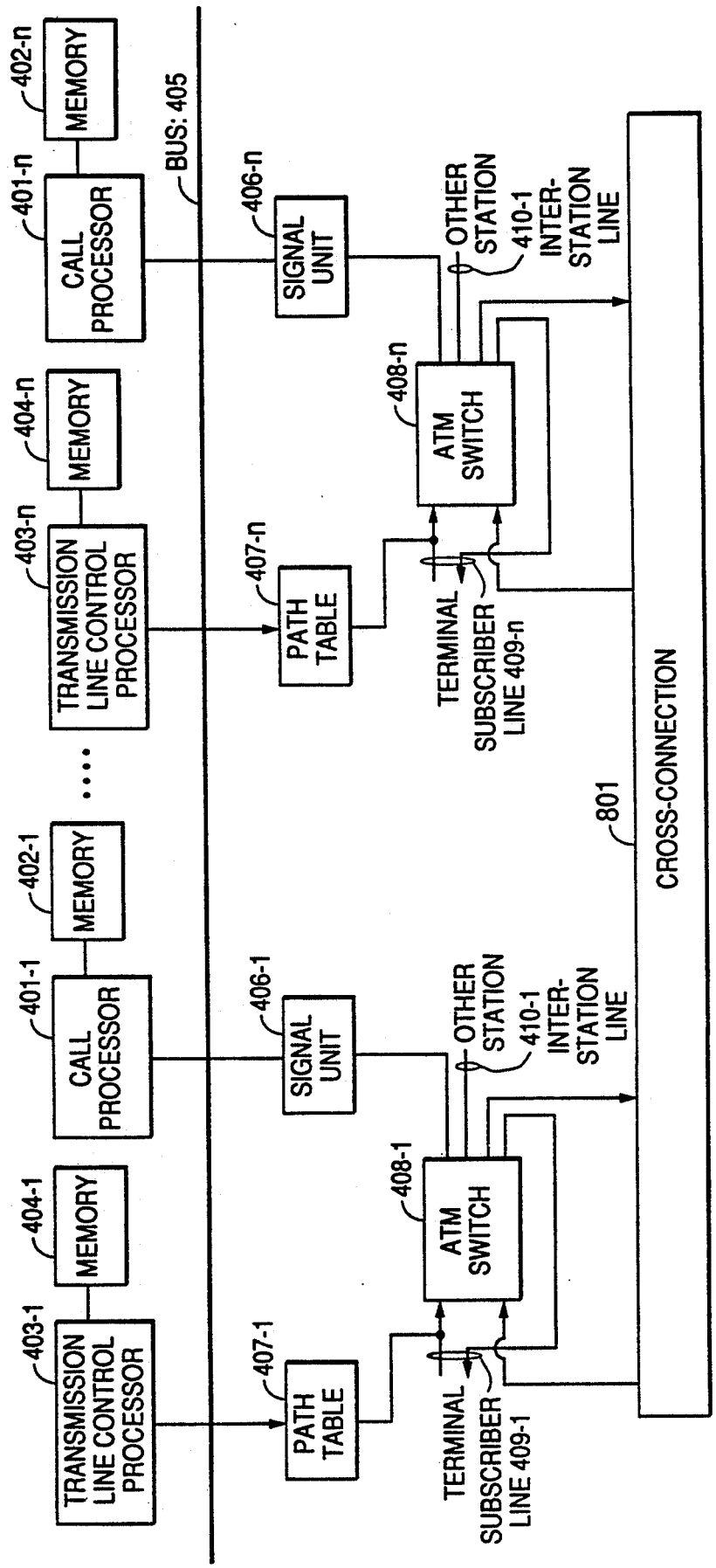
FIG. 10 shows a configuration of the second embodiment.

FIG. 10 shows a configuration of the second embodiment corresponding to the above described second aspect of the present invention, and adopted in a large scale ATM switching system.

The second embodiment shown in FIG. 10, different from the first embodiment shown in FIG. 4, has a configuration in which systems numbered 401-404 and 406-410 in FIG. 4 are connected by the bus 405 in an n set parallel connection as shown by the subscripts "-1"-"-n". The ATM switches 408-1-408-n are connected to one another by the transmission line connection mechanism called "a cross-connection".

Such a configuration facilitates an extension of an ATM switching system in the above described unit of a set.

Figure 11:
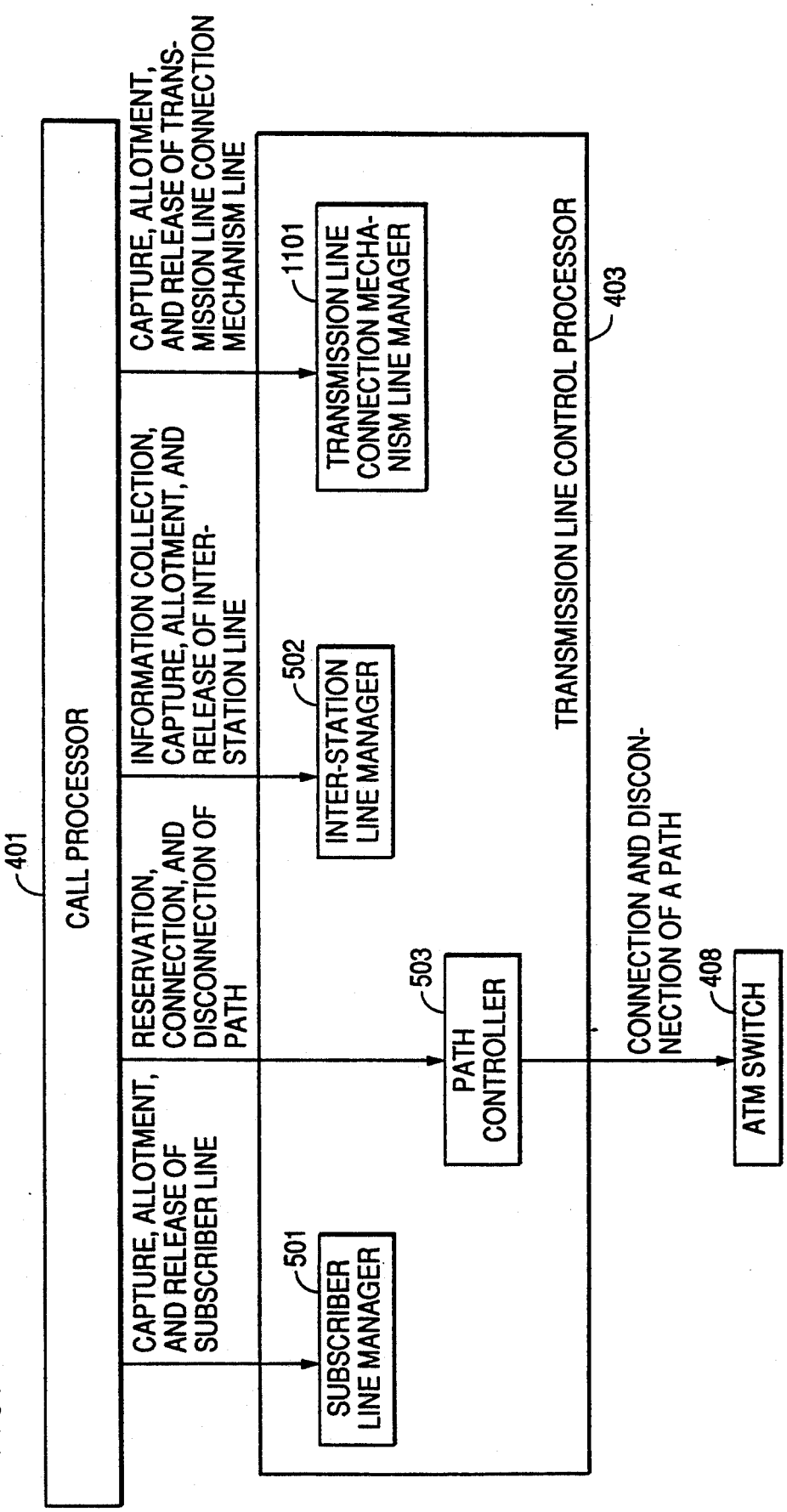
FIG. 11 shows a functional block diagram of the second embodiment.

FIG. 11 shows a functional block diagram centering on the transmission line control processor 403 (any one of 403–403-n) in the second embodiment shown in FIG. 10 where the subscriber line manager 501, inter-station line manager 502, and path controller 503 have the same functions as in the first embodiment. In addition, the second embodiment comprises a transmission line connection mechanism line manager. This manager analytically manages the resources of the cross connect (transmission line connection mechanism line) shown in FIG. 10, and performs processes in response to a request for the capture, allotment, or release request of the transmission line connection mechanism line from the call processor 401.

The operation of the second embodiment shown in FIGS. 10 and 11 is described as follows. In the following description, one optional set of a system from among n sets of complex systems shown in FIG. 10 is represented by the subscripts "-1"-"-n" of part numbers omitted.

In the second embodiment, an optimum output line selecting function and an inter-call-processor communicating function are added to the functions of the call processor 401 in addition to its basic functions described in the explanation of the first embodiment by inquiring of each of the transmission line control processors 403 the available band of the output line of each ATM switches 408. A function for managing the resources of the cross connect 1001 is added to the functions of the transmission line control processor 403, as shown by the transmission line connection mechanism line manager in FIG. 11, in addition to the functions shown in FIG. 5 described in the explanation of the first embodiment.

The above described function to be provided for the call processor 401 which is specific to the second embodiment is described first in association with operational flowcharts in FIGS. 12A-12D. These operational flowcharts are realized as executed by the call processor 401 according to each of the programs stored in the memory 402 shown in FIG. 10.

Figure 12A:
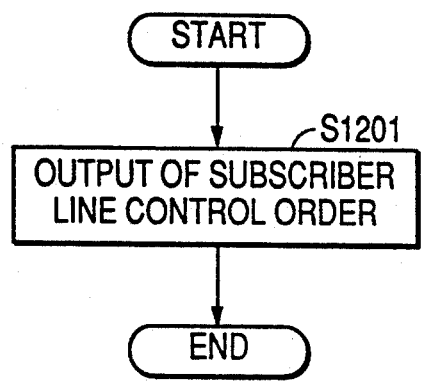
FIGS. 12A, 12B, 12C and 12D show an operational flowchart of a call processor in the second embodiment.

First, the process of step S1201 shown in FIG. 12A is an operational flowchart where the call processor 401 shown in FIG. 10 controls the subscriber line 409.

That is, when the subscriber line 409 is to be controlled, such as when a call is sent or received by a terminal, the call processor 401 checks station data stored in the memory 402, extracts the ATM switch 408 (transmission line) where the subscriber is accommodated, and checks the call processor 401 which is controlling the transmission control processor 403.

If the checked processor is also the checking processor, it issues a control order for the subscriber line 409, that is, a request for the capture, allotment, or release of the subscriber line 409. If the checked processor is not the checking processor, it issues to the checked processor an output order of a control order for the subscriber line 409.

This activates the subscriber line manager 501 in the corresponding transmission line control processor 403 (FIG. 11), and necessary processes are performed according to the operational flowchart shown in FIG. 6 similar to that of the first embodiment.

Figure 12B:
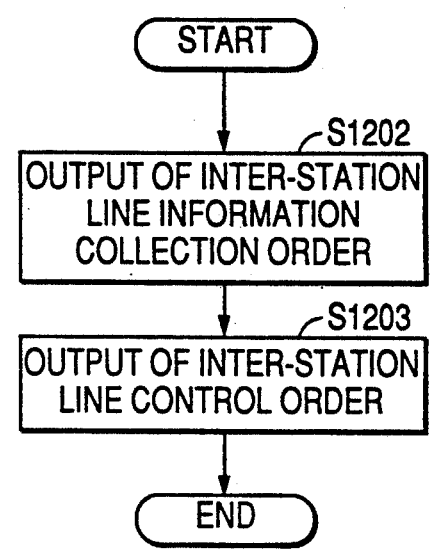

FIG. 12B shows an operational flowchart where the call processor 401 shown in FIG. 10 controls the inter-station line 410.

First, when the inter-station line 410 is to be controlled, the call processor 401 checks station data stored in the memory 402, extracts the ATM switch 408 (transmission line) where the specified inter-station line 410 is accommodated, and issues to all the corresponding transmission line control processors 403 an inter-station line information collection order (S1202).

This activates the inter-station line manager 502 in the corresponding transmission line control processor 403 (FIG. 11), thus collecting inter-station line information. The process is not shown in the operational flowchart of the first embodiment shown in FIG. 7. However, it is a process for checking available bands of the specified inter-station line 410, and the corresponding call processor 401 is notified of the available band information obtained therefrom.

Then, after collecting the inter-station line information from all transmission line control processors 403 which receive an inter-station line information collection order from the call processor 401, the call processor 401 extracts the inter-station line 410 that has the largest available band. Then, the call processor 401 issues to the call processor 401 which is controlling the transmission line control processor 403 corresponding to the inter-station line 410 a control order of the inter-station line 410, that is, an output order of the capture, allotment, or release of the inter-station line 410 (S1203).

Thus, the inter-station line manager 502 in the transmission line control processor 403 connected to the call processor 401 which receives the above described output order is activated by this call processor 401 (FIG. 11), and necessary processes are performed according to the operational flowchart shown in FIG. 7, similar to that of the first embodiment.

Figure 12C:
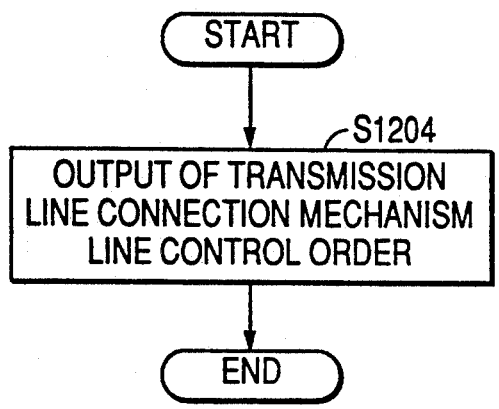

The process of step S1204 shown in FIG. 12C is shown in an operational flowchart where the call processor 401 in FIG. 10 controls the cross-connect (transmission line connection mechanism line).

That is, when, as a result of a process such as call control shown in FIG. 12B, an output line (inter-station line 410) or an input line (subscriber line 409) corresponding to a single call exists in different ATM switches 408 (transmission lines), the call processor 401 issues to the transmission line control processor 403 controlled by said processor 401 a control order of the transmission line connection mechanism line, that is, a request for the capture, allotment, or release of the transmission line connection mechanism line to connect the ATM switches 408 corresponding to the above described output line and input line, respectively.

Figure 13:
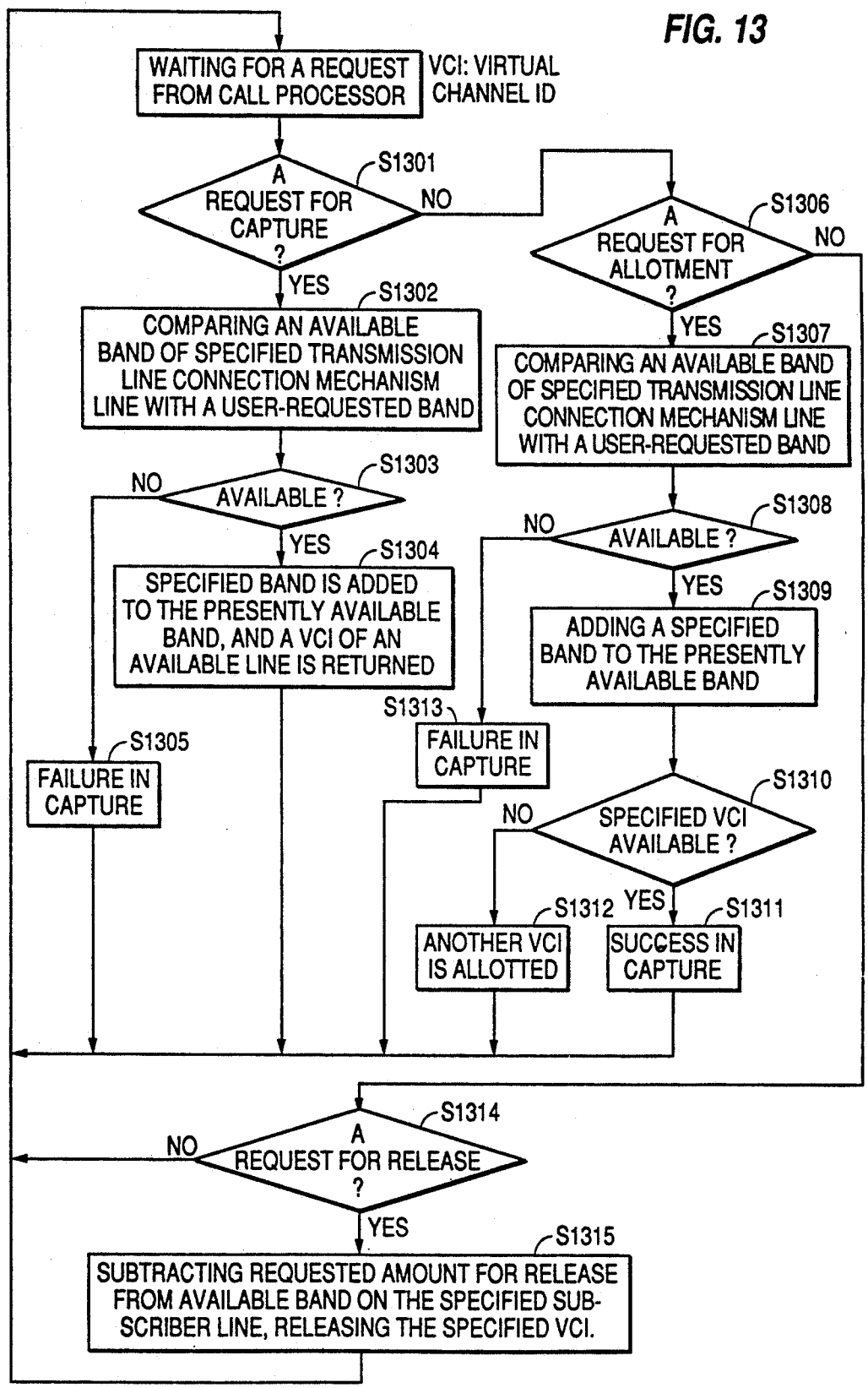
FIG. 13 shows an operational flowchart of a transmission line connection mechanism line manager in the second embodiment.

This activates the transmission line connection mechanism line manager 1101 (FIG. 11) in the transmission line control processor 403. This process is realized by the operational flowchart shown in FIG. 13 as executed by the transmission line control processor 403 according to a program stored in the memory 404 shown in FIG. 4.

In this process, when a request from the call processor 401 relates to the capture, allotment, or release of the cross-connect (transmission line connection mechanism line) 1001, the corresponding process is performed for the cross-connect 1001. In this case, each process in steps S1301–S1315 completely corresponds to each process in steps 601–615 shown in FIG. 6 where the subscriber line 409 should be replaced with the cross-connect (transmission line connection mechanism line) 1001. Thus, the cross-connect 1001 can be captured, allotted, or released according to the request of the call processor 401.

Figure 12D:
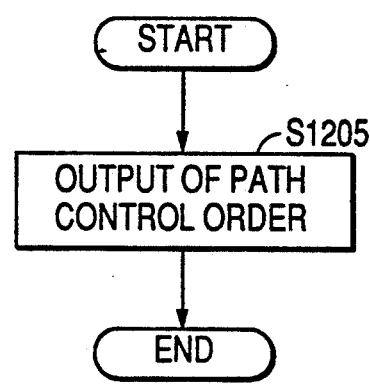

The process of step S1205 shown in FIG. 12D is shown in the operational flowchart where the call processor 401 shown in FIG. 10 controls the cross-connect (transmission line connection mechanism line) 1001.

That is, the call processor 401 issues a path control order to the transmission line control processor 403 which it controls to generate, connect, or disconnect a path between an input line and an output line, where the input line means the subscriber line 409 of a sending terminal, the line of the cross-connect 1001, or the input line of the inter-station line 410; and the output line means the subscriber line 409 of a receiving terminal, the line of the cross-connect 1001, or the output line of the inter-station line 410.

This activates the path controller 503 (FIG. 11) in the transmission line control processor 403, and necessary processes are performed according to the operational flowchart in FIG. 8 similar to that of the first embodiment.

The third Embodiment

Figure 14:
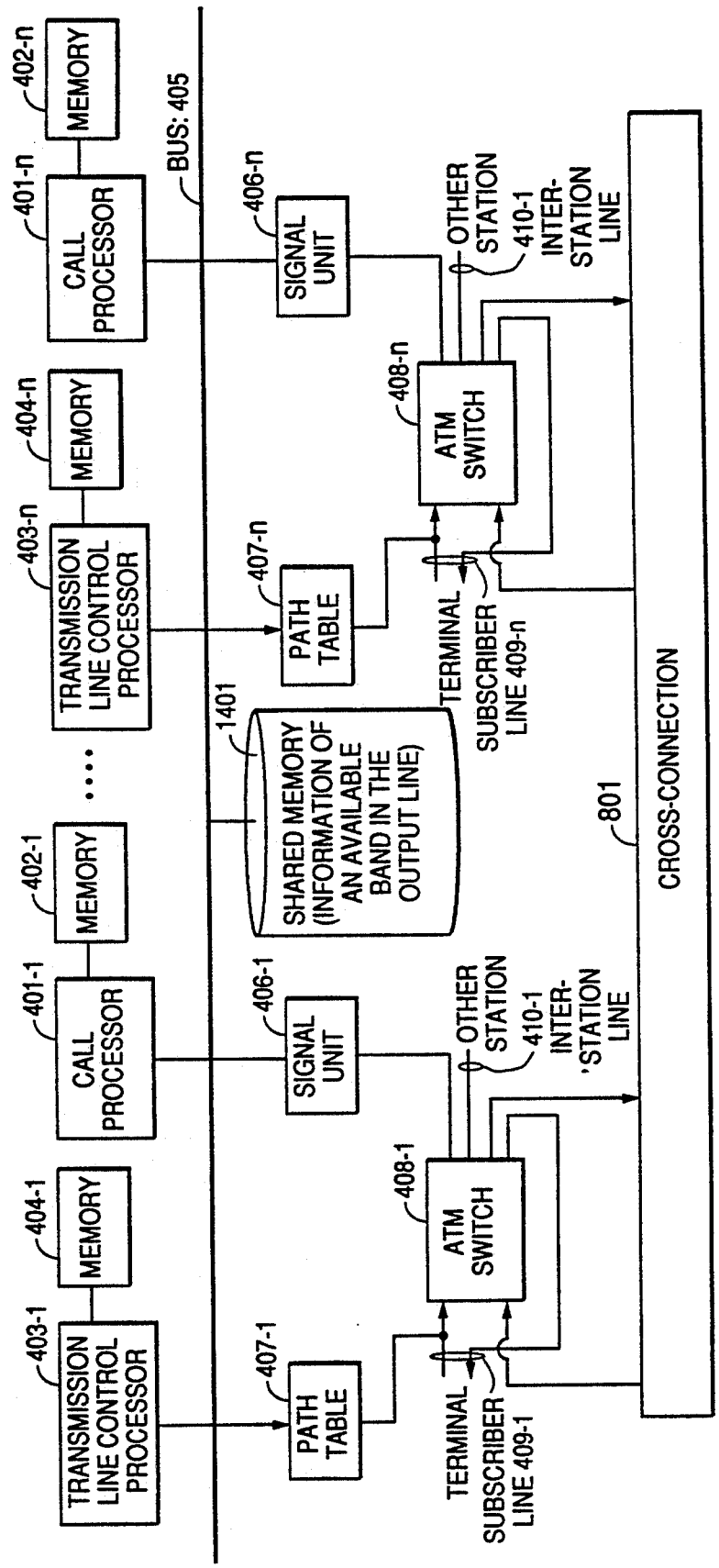
FIG. 14 shows a configuration of the third embodiment.

FIG. 14 shows a configuration of the third embodiment which is adopted in a large scale ATM switching system as in the second embodiment.

The third embodiment shown in FIG. 14 differs from the second embodiment shown in FIG. 10 in that a shared memory 1401 for storing available band information is connected to the bus 405, and in that the information is accessed by all call processors 401-1–401-n.

Figure 15:
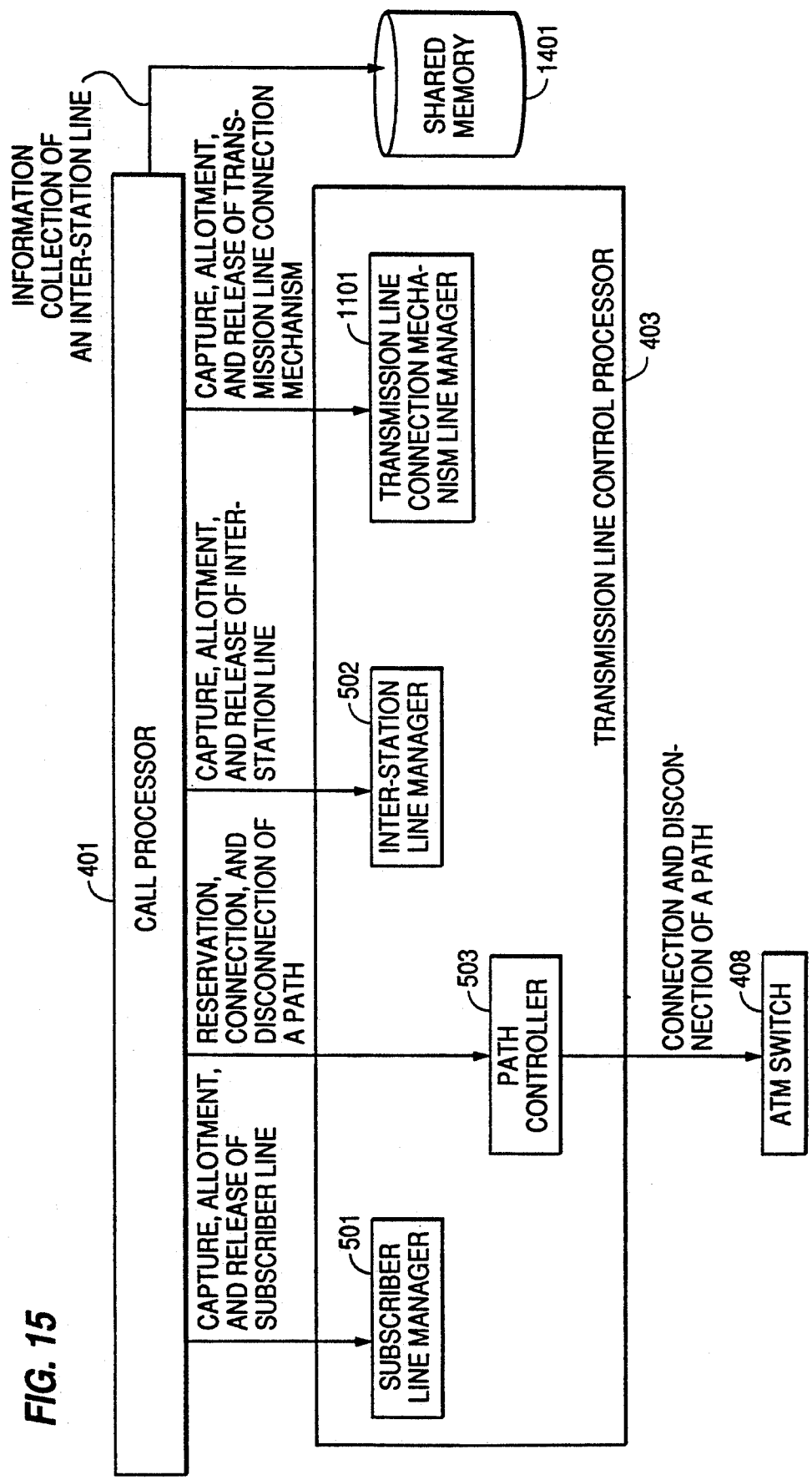
FIG. 15 shows a functional block diagram of the third embodiment.

FIG. 15 shows a functional block chart centering on the transmission line control processor 403 (any one of 403-1–403-n) in the third embodiment shown in FIG. 14 comprising, as in the second embodiment, the subscriber line manager 501, inter-station line manager 502, path controller 503, and transmission line connection mechanism line manager 1101. However, it differs from the second embodiment in that an inter-station line information collection request from the call processor 401 is not issued to the inter-station line manager 502 in the transmission line control processor 403, but to the shared memory 1401.

Therefore, relating to the function of the call processor 401 in the third embodiment, functions for outputting each of the control orders of a subscriber line, a transmission line connection mechanism line, and a path are the same as those in the second embodiment shown in FIGS. 12A, 12C, and 12D. However, the function for outputting a control order of the inter-station line can be shown in the operational flowchart shown in FIG. 16, different from that of the second embodiment shown in FIG. 12B.

Figure 16:
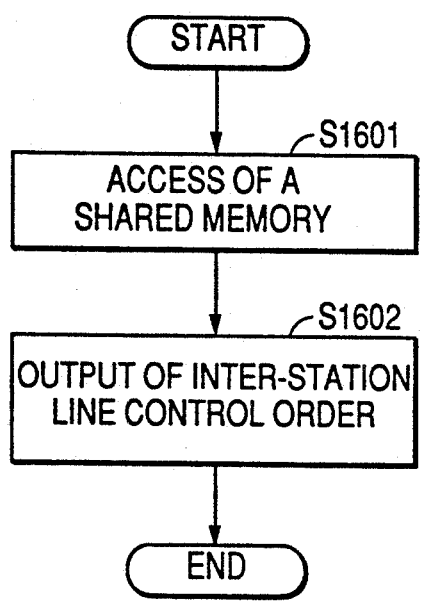
FIG. 16 shows an operational flowchart of an interstation line control order of a call processor in the third embodiment.

That is, when the inter-station line 410 is to be controlled, the call processor 401 checks station data stored in the memory 402, extracts the ATM switch 480 (transmission line) where the specified interstation line 410 is accommodated, and issues a collection order of corresponding inter-station line information to the shared memory 1401, not to the transmission line control processor 403 (S1601 shown in FIG. 16).

Next, after collecting inter-station line information corresponding to all the inter-station lines 10 stored in the shared memory 1401, the call processor 401 extracts the inter-station line 410 that has the largest available band, and issues to the call processor 401 controlling the corresponding transmission line control processor 403 a control order of the inter-station line 401, that is, an output order of a request for the capture, allotment, or release of the inter-station line 401 (S1602).

This activates the inter-station line manager 502 in the corresponding transmission line control processor 403 (FIG. 15) as in the second embodiment, and necessary processes are performed according to the operational flowchart shown in FIG. 7, identical to that in the first embodiment.

The 4th Embodiment

Figure 17:
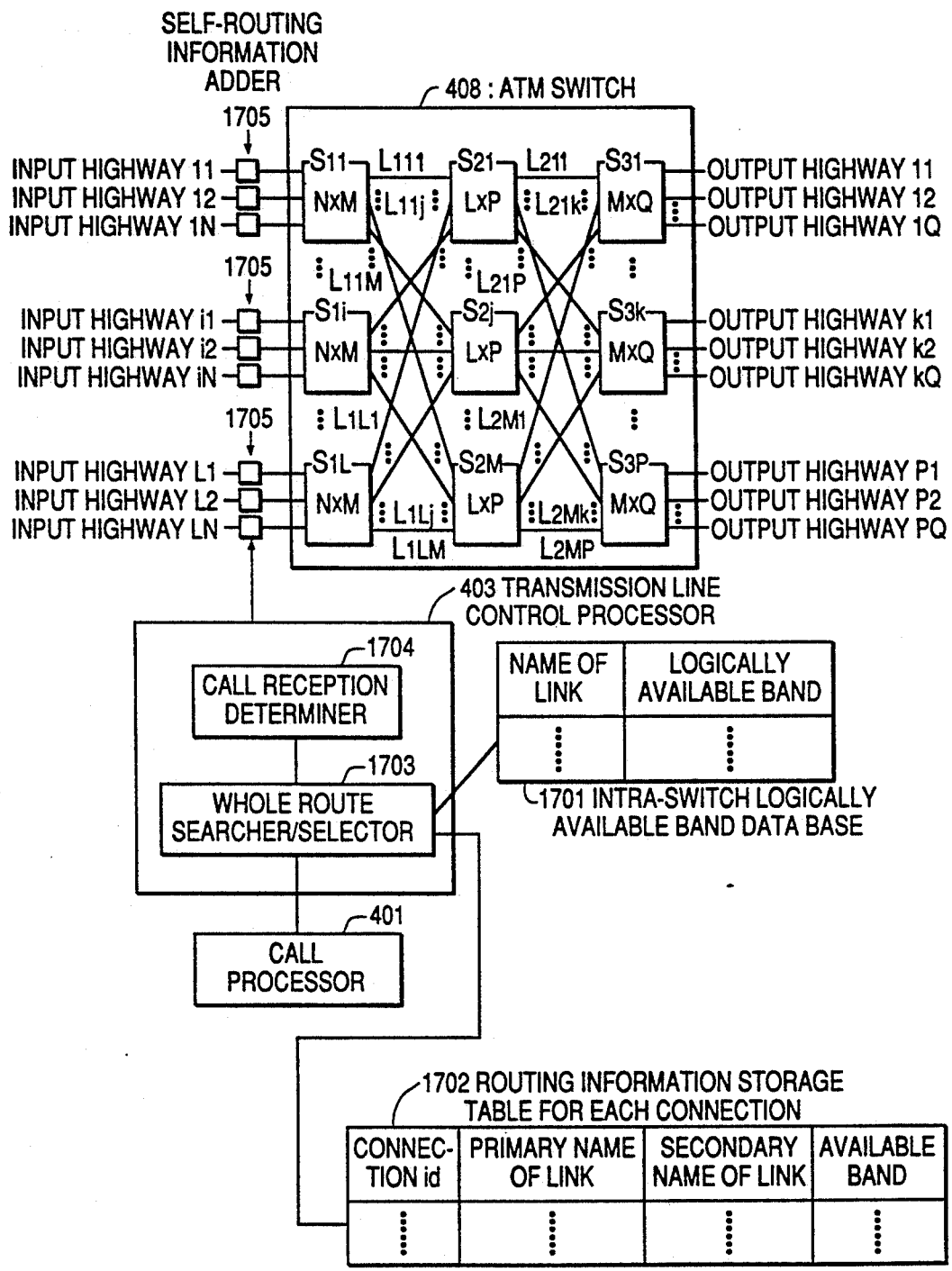
FIG. 17 shows a configuration of the fourth embodiment.

FIG. 17 shows a configuration of the fourth embodiment corresponding to the above described fourth aspect of the present invention.

The fourth embodiment corresponds to an embodiment disclosed as a practical example of a configuration of the ATM switch 408 in the first embodiment shown in FIGS. 4 and 5, and of a functional configuration of the path controller 503 in the transmission line control processor 403.

In FIG. 17, the ATM switch 408 has a configuration in which switching modules each comprising a plurality of highway input parts and a plurality of highway output parts are configured in the form of a matrix. The 1st-step switching modules are $S_{l1}, \ldots, S_{li}, \ldots, S_{iL}$, a sum of L units. The 2nd-step switching modules are $S_{21}, \ldots, S_{2j}, \ldots, S_{2M}$, a total of M units. The 3rd-step switching modules are $S_{31}, \ldots, S_{3k}, \ldots, S_{3P}$, a total of P units.

Each of the modules in the second step is connected to each of the switching modules in the first and third steps. N lines of input highway (HW) are connected to each of the switching modules in the first step. N lines of output highway (HW) are connected to each of the switching modules in the first step.

That is, each of the switching modules in the first step is associated with NxM switching (N shows the number of input and M shows the number of output) each of the switching modules in the second step is associated with LxP switching (input and output numbers respectively) and each of the switching modules in the third step is associated with MxQ switching (input and output numbers respectively).

The number of steps of switching modules is not limited to three steps.

As shown in the above described configuration, the ATM switch 408 comprises a plurality of routes from one input highway to one output highway.

Then, a whole route searcher/selector 1703 and a call admission determiner 1704 to be realized as a functional configuration of the transmission control processor 403 shown in FIG. 17 correspond to step S802 shown in FIG. 8.

That is, in the fourth embodiment, when a request of the call processor 401 relates to a path reservation, a process for determining the optimum internal route of the ATM switch 408 is practically disclosed using the input highway number, the output highway number of the specified ATM switch 408, and the required number of bands.

A call admission determiner 1704 described later corresponds to a part of the subscriber line manager 501 and the inter-station line manager 502 in the first embodiment shown in FIG. 5.

In FIG. 17, an intra-switch logically available band data base (DB) 1701 accessed by the whole route searcher/selector 1703, and a routing information storage table 1702 for each connection are provided. They are stored in a storage unit corresponding to the memory 204 in the first embodiment shown in FIG. 4.

A self-routing information adder 1705 provided on each input highway connected to the ATM switch 408 shown in FIG. 17 corresponds to the path table 407 of the first embodiment shown in FIG. 4.

In FIG. 17, configurations corresponding to the signal unit 406 of the first embodiment in FIG. 4 and the memory 402 connected to the call processor 401 are skipped.

The fourth embodiment comprising the above described functional configuration is described as follows As described above, when a request from the call processor 401 relates to a path reservation in the fourth embodiment, a series of the following processes is performed to determine the optimum internal route of the ATM switch 408 using input and output numbers and the requested number of available bands. These processes correspond to step S802 shown in FIG. 8 for indicating the operation of the bus controller 503 in the first embodiment shown in FIG. 5.

First, the whole route searcher/selector 1703 is activated.

The intra-switch logically available band data base 1701 is connected to the searcher/selector 1703. A value of a logically available band, that is, a band currently in use, is stored in the data base for each link in the ATM switch 408. The whole route searcher/selector 311 selects the route that has the smallest available band of all routes in the ATM switch 408 from the specified input highway toward the specified output highway as referring to the intra-switch logically available data base 1701 according to an input highway number and output highway number forming a part of a path connection request from the call processor 401.

Suppose that a link $L_{lij}$ connects the ith ($1 \leq i \leq L$) switching module $S_{li}$ in the first step and the jth ($1 \leq j \leq M$) switching module $S_{2j}$ in the second step; a link $L_{2jk}$ connects the jth switching module $S_{2j}$ in the second step and the kth ($1 \leq k \leq P$) switching module $S_{3k}$ of the third step; and Values of available bands of the links $L_{lij}$ and $L_{2jk}$ are $V_{lij}$ and $V_{2jk}$, respectively.

When an input highway number and output highway number of the ATM switch 408 are specified at a path reservation request from the call processor, the first and the third switching modules at the ATM switch 408 are uniquely determined. Suppose the switching module in the first step is $S_{li}$ (i is in the range of 1 - L), and the switching module in the third step is $S_{3k}$ (k is in the range of 1 - P). Therefore, if a switching module in the second step is determined, a route in the ATM switch 408 from the specified input highway to the specified output highway can be determined. That is, assuming that the target switching module in the second step is $S_{2j}$ (i is in the range of 1 - M), a target route will comprise the links $L_{lij}$ and $L_{2jk}$. The obtained route is called "a route j" using the number j in the second switching module $S_{2j}$.

Figure 18:
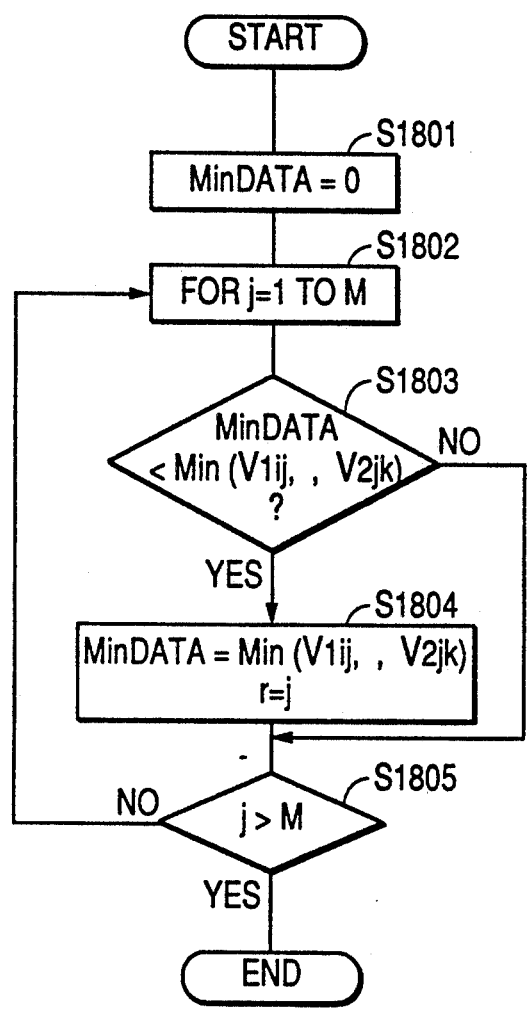
FIG. 18 shows an operational flowchart of a whole route selector in the fourth embodiment.

FIG. 18 shows an operational flowchart for realizing a function of the whole searcher/selector 1703 for determining the optimum route in the above described route j. This flowchart is realized as executed by the transmission route control processor 403 according to a program stored in a memory not shown specifically in FIG. 18 but corresponding to the memory 404 in the first embodiment shown in FIG. 4.

In step S1801, a variable MINDATA is initialized to zero (0).

Then, processes of S1803 and S1804 are repeated while steps S1802 and S1805 increment a variable j to 1 - M. The variable j sequentially specifies each of the switching modules $S_{2j}$ in the second step.

In step S1803, an available band $V_{lij}$ of a link $L_{lij}$ connecting a specified switching module $S_{li}$ in the first step and a switching module $S_{2j}$ in the second step specified by the variable j can be obtained by referring to an intra-switch logically available band data base 1701. Therefore, the available band $V_{lij}$ can be obtained by subtracting a value of logically available bands corresponding to the link $L_{lij}$ in the inter-switch band data base 1701 from the maximum band in the link, and similarly by subtracting, a value of available bands $V_{2jk}$ of a link $L_{2jk}$ connecting a switching module $S_{2j}$ in the second step and a specified switching module $S_{3k}$ in the third step. A smaller value between the available band values $V_{lij}$ and $V_{2jk}$ can be obtained from the following expression:

$$\text{Min } (V_{lij}, V_{2jk}) \tag{1}$$

Then, determination is made as to whether or not the obtained value is larger than the variable MINDATA.

If the determination in step S1803 is "yes", the variable MINDATA is replaced with a value MIN ($V_{lij}$, $V_{2jk}$) obtained in step S1802, and the the variable j is substituted for the variable r.

If the determination in step S1802 is "no", the process in step S1803 is not executed. Accordingly, the variable MINDATA and the variable r remains unchanged.

When the processes of the above described steps S1802 and S1803 are performed for all switching modules in the second step, the determination in step S1805 turns finally to "yes".

At this point, the variable r indicates a route number having the smallest available band of all routes in the STM switch 408 from a specified input highway to a specified output highway; and the variable MINDATA indicates an available band of the route r.

As described above, when, in the whole route searcher/selector 311, the optimum route corresponding to an input highway number and output highway number referred to as a part of a user's path reservation request is determined, the call admission determiner 312 shown in FIG. 17 is activated.

The determiner determines whether or not a call for a requested band is acceptable, in the optimum route determined by the whole route searcher/selector 311, based on a value of a requested available band referred to as a part of a path connection request from the call processor 401.

Figure 19:
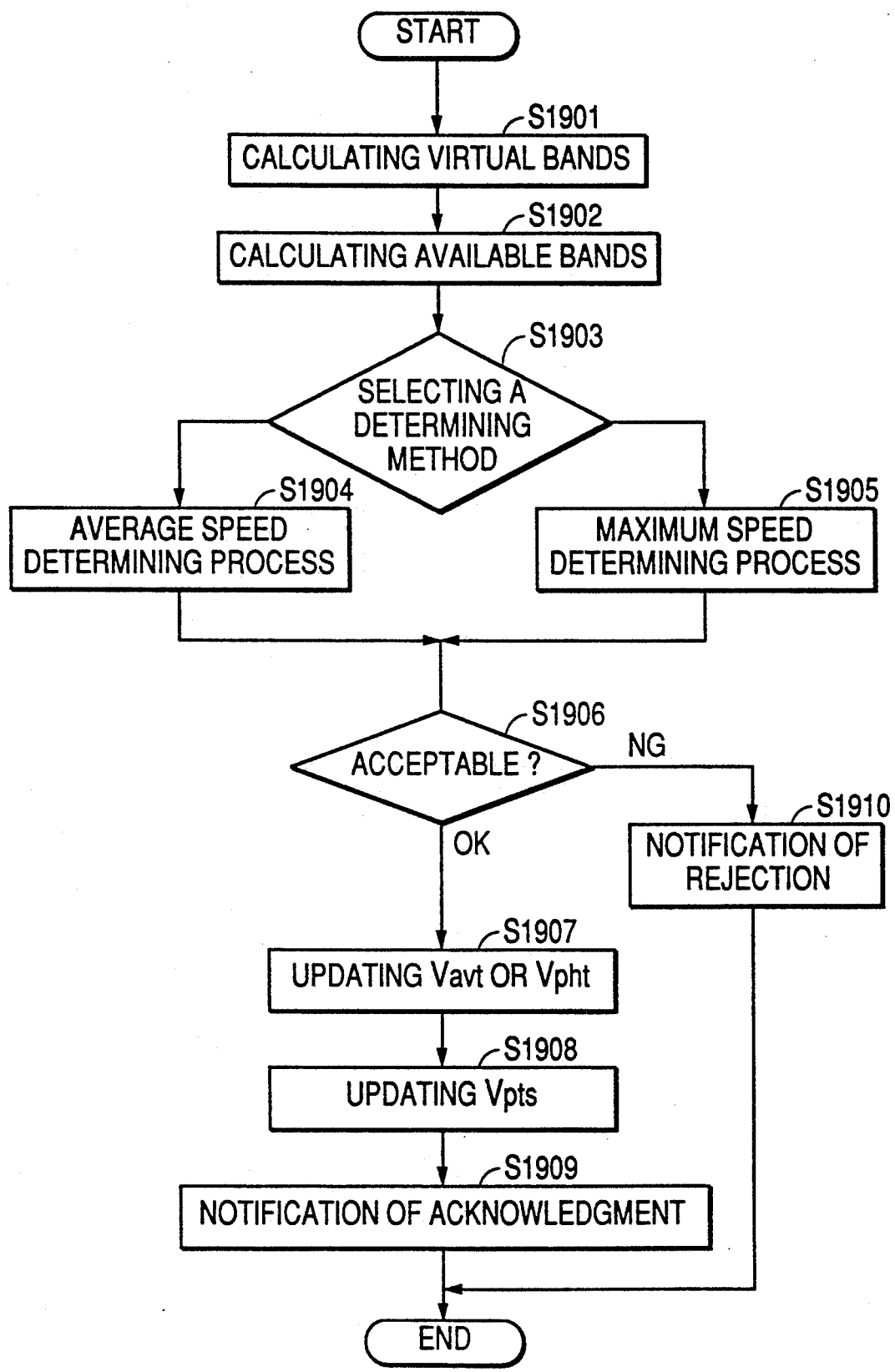
FIG. 19 shows an operational flowchart of a call admission determiner in the fourth embodiment.

FIG. 19 shows an operational flowchart for realizing the function of the call admission determiner 312. This flowchart describes an execution by the transmission line control processor 403 according to a program stored in a memory not specified in FIG. 19 (but corresponding to the memory 404 in the first embodiment shown in FIG. 4).

FIG. 20 shows a list of parameters to be used in the operational flowchart shown in FIG. 19.

First, in step S1901, an average value A and a distribution value V of cell traffic referred to as users' virtual bands are calculated, according to a requested available band value referred to as a part of a path connection request from the call processor 401, for each link forming the optimum route determined by the whole route searcher/selector 311. That is, the requested available band value is presented as a maximum call speed $V_p$, average speed $V_{av}$, and the number of generated cells during a continuous burst period $N_c$. Using these values, an average value A and a distribution value V of cell traffic referred to as users' virtual bands are calculated for each link from the following expressions (2) and (3).

$$A = V_{av}/V_{ts} \tag{2}$$

$$V = A(2N_c - 1)(1 - V_{av}/V_p) \tag{3}$$

where $V_{ts}$ indicates a maximum speed of physical transmission lines in which each link is accommodated, and the value is stored in a memory not shown in FIG. 17 but connected to the transmission line control processor 403 (corresponding to the memory 404 in the first embodiment shown in FIG. 4). Normally, the value $V_{ts}$ is common in all links in the ATM switch 408 shown in FIG. 17.

Then, in step S1902, the above described available band information for each link is extracted. That is, a maximum transmission speed $V_l$ for each link, a sum $V_{pts}$ of maximum speeds of all calls during communication in each link, a sum $V_{avt}$ of average speeds of all calls assigned at an average speed in each link, and a sum $V_{pht}$ of average speeds of all calls assigned at the maximum speed in each link. Information for each link is stored in a memory not shown in FIG. 17 but connected to the transmission line control processor 403 (corresponding to the memory 404 in the first embodiment shown in FIG. 4).

Then, in step S1903, determination is made as to whether or not the following expressions (4) and (5) are true in each link:

$$V_L - V_{phL})/V > X \tag{4}$$

$$V/A < 1 \tag{5}$$

If expressions (4) and (5) are valid for a link, it implies that the traffic is available in the link.

If expressions (4) and (5) are valid for a link, that is, the traffic is available in the link, determination is made by the average speed determination method as to whether or not a call for a requested band is acceptable in step S1904. However, if the expressions (4) and (5) are false for a link, that is, the traffic is congested, determination is made by the maximum speed determination method as to whether or not a call for a requested band is acceptable in step S1905.

That is, in the average speed determination process in step S1904, determination is made as to whether or not the following expression (6) is true in a specific link:

$$(V_{av} + V_{avt}) < (V_l - V_{phl}) \times p_{max} \tag{6}$$

where $p_{max}$ is a constant. If expression (6) is valid, a call for a requested band is determined as acceptable in the link.

In the maximum speed determining process in step S1905, determination is made as to whether or not the following expression (7) is valid in a specific link.

$$(V_{pls} + V_p) < V_l \tag{7}$$

If expression (7) is valid, a call for a requested band is determined as acceptable in the link.

After all links are determined by the average speed determining process in step S1904 or the maximum speed determining process in step S1905, determination is made as to whether or not a call for a requested band in all links is acceptable.

If a call for a requested band in all links is determined as acceptable in step S1906, the following steps S1907–S1909 are executed.

In step S1907, each of the following parameters stored in a memory not shown in FIG. 19 is updated for each link. When the average speed determining process in step S1904 is performed, a sum $V_{avt}$ of average speeds of all calls assigned at an average speed in a corresponding link is updated by adding an average speed $V_{av}$ of requested calls to the sum $V_{avt}$. However, when the average speed determining process in step S1905 is executed, a sum $V_{pht}$ of maximum speeds of all calls assigned at a maximum speed in a corresponding link is updated by adding a maximum speed $V_p$ of requested calls to the sum $V_{pht}$.

Next, in step S1908, a sum $V_{pts}$ of maximum speeds of all calls in communication in each link is updated by adding the maximum speed $V_p$ of requested calls to the sum $V_{pts}$.

In step S1909, the whole route searcher/selector 1703 shown in FIG. 17 is notified that the requested call is acceptable, thus terminating the process of the call admission determiner 1704 shown in FIG. 17.

If, in the above described step S1906, a call for a requested band is determined as having an unacceptable link, the whole route searcher/selector 1703 is notified in step S1910 that the reception of requested calls is rejected, thus terminating the process of the call admission determiner 1704 shown in FIG. 17.

Then, the whole route searcher/selector 1703 shown in FIG. 17 is activated again for the above described operation of the call admission determiner 1704. In this case, the function of the whole route searcher/selector 1703 is different from that indicated in the operational flowchart shown in FIG. 17.

That is, on receiving notification from the call reception determiner 1704 that a requested call is acceptable, the route searcher/selector 1703 performs the following process.

That is, the whole route searcher/selector 1703 updates a value of a logically available band in the intra-switch logically available band data base 1701 shown in FIG. 17 for each link corresponding to the determined optimum route by adding an average speed $V_{av}$ of requested calls to the value of the said logically available band.

Then, the whole rout searcher/selector 1703 assigns an identifier (connection id) to the determined optimum route, and the connection id is stored with the link name forming the route and logically available band of requested calls (for example, an average speed $V_{av}$ in the routing information storage table 1702 for each connection shown in FIG. 17). A primary link name indicates a number of a link connecting a switching module in the first step to one in the second step. Likewise, the secondary link name indicates a number of a link connecting a switching module in the second step to one in the third step.

The whole route searcher/selector 1703 notifies the call processor 401 shown in FIG. 17 of the value of the above described connection id.

However, on receiving notification from the call admission determiner 1704 that reception of a requested call is rejected, the whole route searcher/selector 1703 notifies the call processor 401 shown in FIG. 17 of the rejection of the requested call without performing a process on the routing information storage table 1702 for each connection.

As a series of processes by the whole route searcher/selector 1703 and call reception processor 1704 in the transmission line control processor 403 shown in FIG. 17, a process is realized to determine the optimum internal route for the ATM switch 408 in response to a path reservation request from the call processor 401.

Figure 21:
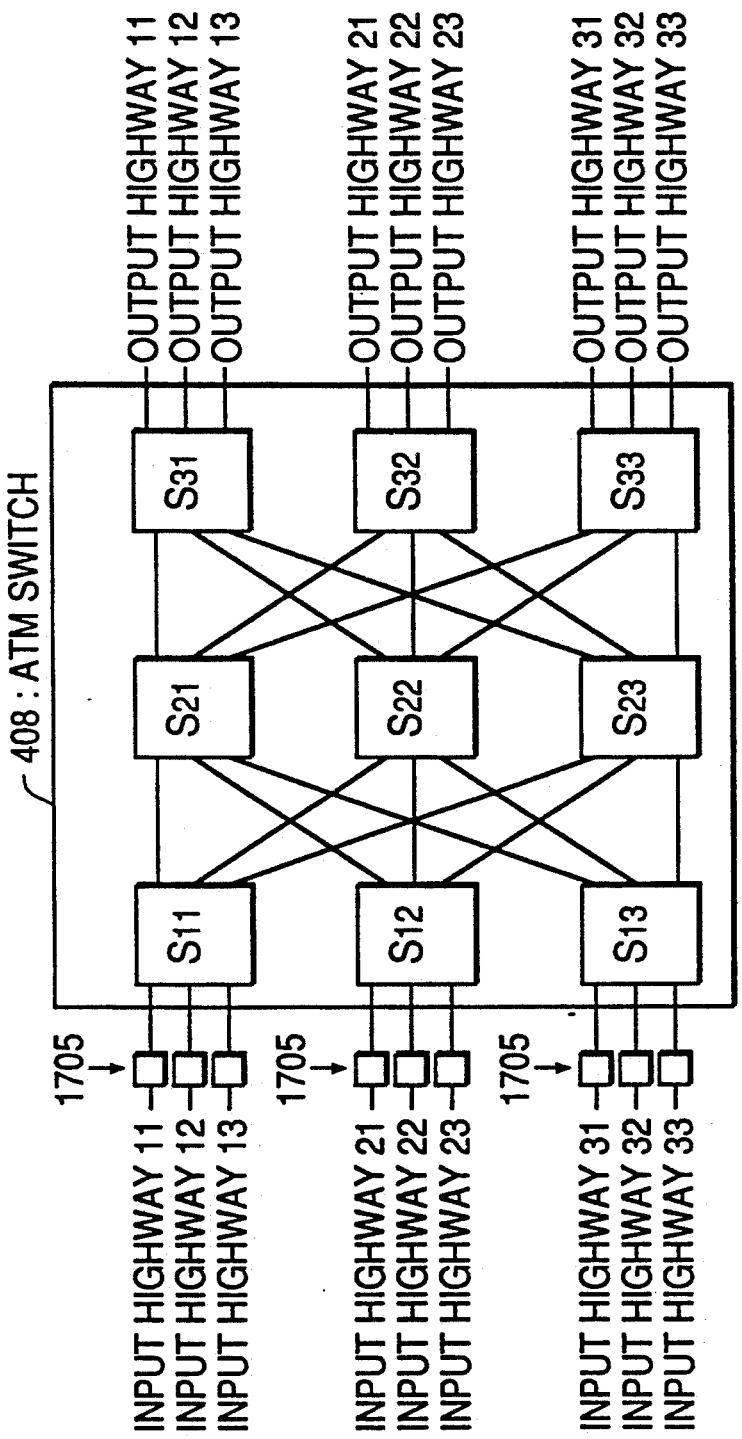
FIG. 21 shows a configuration of a transmission line switch the fourth embodiment.

FIG. 21 shows a configuration example of the fourth embodiment shown in FIG. 17 where the number of switching modules in each step in the ATM switch 408 is modified to three (that is, L=M=P=3). FIG. 22 shows an example of contents of the intra-switch logically available band data base 1701 shown in FIG. 17.

Suppose that an input highway number=HW11, an output highway number=HW33, and an available band (average speed)=40 Mbps (megabit/second) are specified as a path reservation request from the call processor 401.

In receipt of this request, the transmission control processor 403 shown in FIG. 17 executes the operational flowchart shown in FIG. 18 corresponding to the whole route searcher/selector 1703, thus selecting route 3 comprising a link $L_{113}$ and $L_{233}$ as having the smallest available band.

When the operational flowchart shown in FIG. 19 corresponding to the call admission determiner 1704, and a call for a requested band is determined as acceptable in the above selected route 3, the whole route searcher/selector 1703 is notified of the result.

The searcher/selector updates, for each of the links $L_{113}$ and $L_{233}$ corresponding to the above determined route 3, the value of the logically available band in the intra-switch logically available band data base 1701 shown in FIG. 22 by adding to the said value of the logically available band an available band 40 Mbps of a requested call. As a result, the data base is updated as shown in FIG. 23.

Besides, the whole route searcher/selector 1703 adds "100", for example, as a connection id to the above determined route 3, and stores the id together with the primary link name $L_{113}$; secondary link name $L_{233}$; and the value of an available band 40 Mbps of a requested call in the routing information storage table 1702 provided for each connection, as shown in FIG. 17. As a result, the content of the table is as shown in FIG. 24.

The operation of the fourth embodiment at a path reservation request from the call processor 401 is described above. If a path connection request is issued by the call processor 401 after the above described path reservation request, the transmission control processor 403 shown in FIG. 17 performs a process corresponding to step S804 shown in FIG. 8 as a functional configuration of the path controller 503 in the first embodiment shown in FIG. 5. Then, using a connection id specified by the call processor 401, the routing information storage table 1702 is referred to for each connection as shown in FIG. 17, and the routing information read out of the table, that is, the primary link name and the secondary link name is outputted with the connection id to the self-routing information adder 1705 on the specified input highway shown in FIG. 17.

When a path disconnection request is issued by the call processor 401, the transmission line control processor 403 shown in FIG. 17 performs a process corresponding to step S806 shown in FIG. 8 as a functional configuration of the path controller 503 in the first embodiment shown in FIG. 5. This deletes routing information corresponding to the information in the routing information storage table 1702 for each connection shown in FIG. 17, and decrements the band by the deleted amount in the corresponding link in the intra-switch logically available band data base 1701 shown in FIG. 17.

In the explanation up to this point, the call reception determiner 1704 has been explained as a part of the functional configuration of the path controller 503 in the first embodiment shown in FIG. 5, but it also corresponds to a part of a function of the subscriber line manager 501 and inter-station manager 502 in the first embodiment shown in FIG. 5.

That is, the call admission determiner 1704 shown in FIG. 17 is also activated when steps S602 and S607 shown in FIG. 6 are performed by the transmission line control processor 403 as a function of the subscriber line manager 501 shown in FIG. 5 at a capture or allotment request, etc. of the subscriber line 409 issued from the call processor 401. Then, a determination is made in the same process as indicated by the operational flowchart shown in FIG. 19 as to whether the reception of a requested call is acceptable in the specified subscriber line 409.

Likewise, the call admission determiner 1704 shown in FIG. 17 is also activated when steps S702 and S707 shown in FIG. 7 are performed by the transmission line control processor 403 as a function of the inter-station line manager 502 shown in FIG. 5 at a capture or allotment request, etc. of the subscriber line 410 issued from the call processor 401. Then, a determination is made in the same process as that indicated by the operational flowchart shown in FIG. 19 as to whether the reception of a requested call is acceptable in the specified inter-station line 410.

The 5th Embodiment

Figures 25, 26:
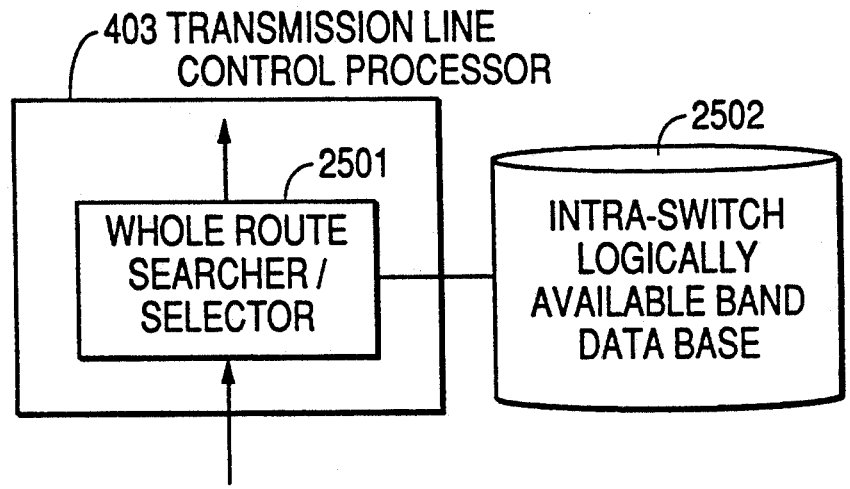
FIG. 25 shows a configuration of the main parts of the fifth embodiment.
FIG. 26 shows a configuration of an ascending table in the fifth embodiment.

FIG. 25 shows a configuration of a main part of the fifth embodiment of the present invention, and shows a part of a functional configuration of a transmission line control processor.

The fifth embodiment corresponds, as does the fourth embodiment, to the previously described fourth aspect of the present invention. The fifth embodiment shown in FIG. 25 has a similar configuration to that of the fourth embodiment. However, the whole route searcher/selector 1703 and the intra-switch logically available band data base 1701 in the fourth embodiment shown in FIG. 17 are replaced with a whole route searcher/selector 2501 and an intraswitch logically available band data base 2502 each having somewhat different functions from those of components 1703 and 1701 in the fourth embodiment. Other parts of the configuration are the same as those in the fourth embodiment.

In FIG. 25, the intra-switch logically available band data base 2502, like the intra-switch logically available band data base 1701 shown in FIG. 17, stores values of logically available bands which are currently used for each link in the ATM switch 408.

Additionally, the intra-switch logically available band data base 2502 stores an ascending table starting with the largest available band value for storing, for each switching module in the first step, names of links connecting each module in the first step to modules in the second step available band values corresponding to respective links. FIG. 26 shows a configuration of the ascending table.

When referring to the intra-switch logically available band data base 2502 based on an input and output highway numbers which are parts of a path connection request issued from the call processor 401, the whole route searcher/selector 2501 selects the leading link in the storage unit corresponding to a switching module uniquely determined by a specified input highway number. The selected link has the largest available band in the output link of the corresponding switching module.

Thus, a corresponding switching module in the second step is determined, and a link connecting the switching module in the second step to a switching module in the third step is uniquely determined, thus establishing a route in the ATM switch 408 from the specified input highway to the specified output highway.

Thus, the whole route searcher/selector 2501 in the fifth embodiment need not execute a route determining algorithm in the fourth embodiment shown in FIG. 18, thus establishing a route in a short time.

Hereafter, when a call admission determiner not shown in FIG. 25 as in the fourth embodiment (refer to 1704 in FIG. 17) determines that a call for a requested band is acceptable in a selected route, the whole route searcher/selector 2501 updates a value of a logically available band of the intra-switch logically available band data base 2502, and sorts for the above described ascending table.

The sorting method can be any of the existing methods, such as the binary searching method.

The 6th embodiment

Figures 27, 28:
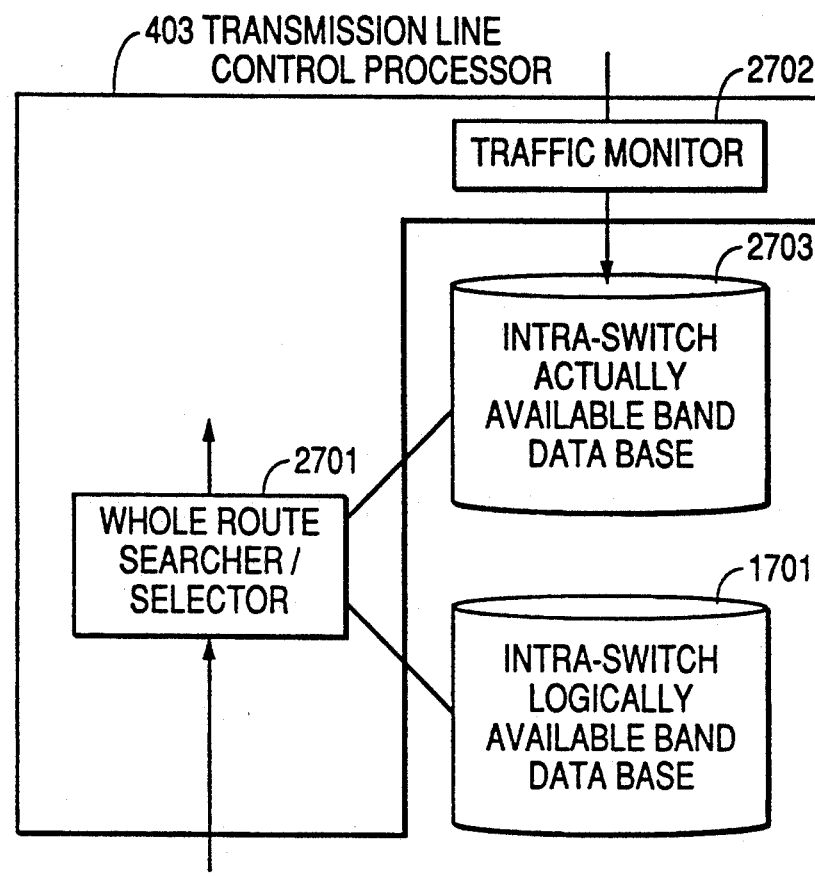
FIG. 27 shows a configuration of the main parts of the sixth embodiment.
FIG. 28 shows examples of contents of an intraswitch actually available band data base in the sixth embodiment.

FIG. 27 shows a configuration of main parts of the sixth embodiment of the present invention, and shows a part of the functional configuration of a transmission line control processor.

The sixth embodiment corresponds to the fourth aspect of the present invention, as does the above described fourth embodiment. The sixth embodiment shown in FIG. 27 comprises the intra-switch logically available band data base 1701 similar to that in the fourth embodiment. However, the whole route searcher/selector 1703 in the fourth embodiment shown in FIG. 17 is replaced with a whole route searcher/selector 2701 having somewhat different functions from those of the whole route searcher/selector 1703. Additionally, the sixth embodiment shown in FIG. 27 comprises a traffic monitor 2702 for monitoring actual values indicating the usage of each link of each switching module in the ATM switch (refer to 408 in FIG. 17), and an intra-switch actually available band data base (DB) 2703 for storing information provided by the traffic monitor 2702. Other parts of the configuration of the sixth embodiment are the same as those in the above described fourth embodiment.

The operation of the sixth embodiment is described as follows:

First, the traffic monitor 2702 monitors actual values indicating the usage of each link of each switching module in the ATM switch, and stores them in the intra-switch actually available band data base 2703.

FIG. 28 shows an example of contents of the intra-switch actually available band data base 2703. A buffer usage rage (%) is indicated for each link name.

Figure 29:
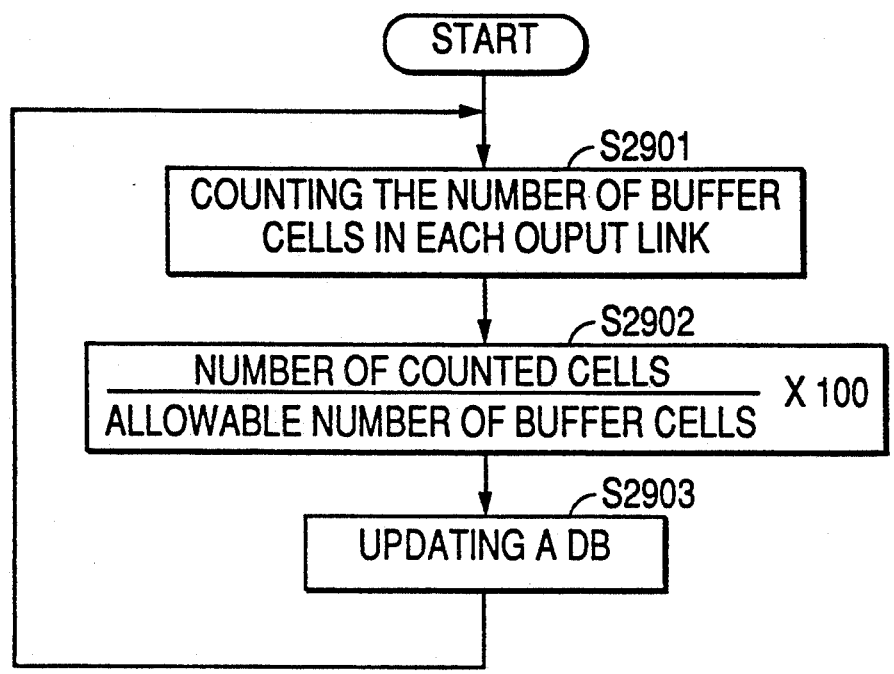
FIG. 29 shows an operational flowchart of a traffic monitor in the sixth embodiment.

FIG. 29 shows an operational flowchart for realizing functions of the traffic monitor 2702 for updating data in the intra-switch actually available band data base 2703. This process flow is realized as executed by the transmission line control processor 403 according to a program stored in a memory (corresponding to the memory 404 in the first embodiment shown in FIG. 4), not shown in FIG. 29.

First, in step S2901, the number of cells stored in a buffer in each output link of each switching module (in a buffer in a link outgoing to a switching module in the next step) is counted.

Next, in step S2902, buffer usage rate is calculated from the following expression (8):

$$\text{Buffer Usage} = (\text{count cell number/allowable sell number of the buffer}) \times 100 \quad (8)$$

Then, in step S2903, the buffer usage rate obtained in step S2902 is stored in the corresponding area in the intra-switch actually available band data base 2703. The whole route searcher/selector 2701 selects the optimum route according to two data bases: the intra-switch logically available band data base 1701 similar to that in the fourth embodiment shown in FIG. 17 and the intra-switch actually available band data base 2703.

Figure 30:
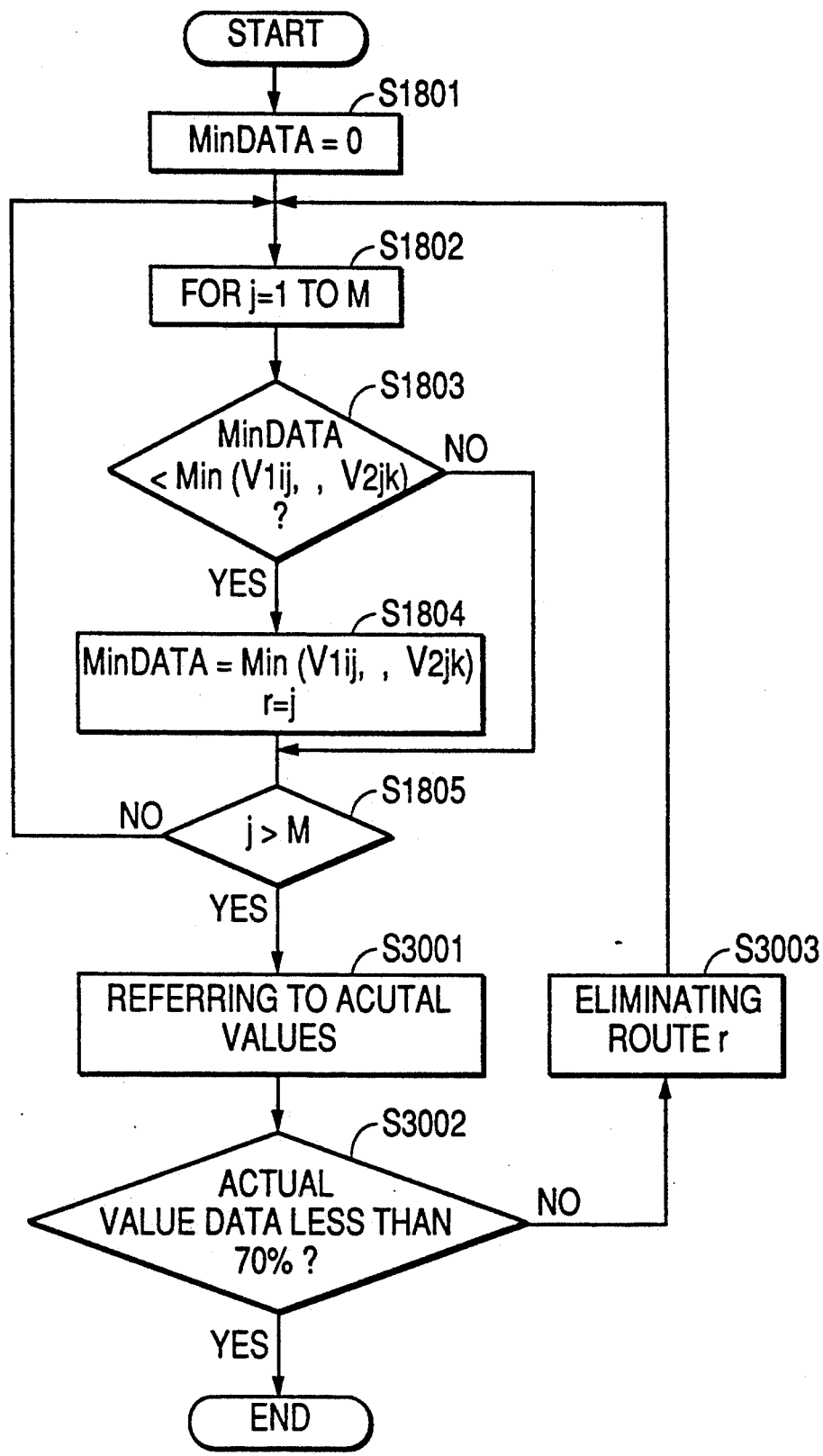
FIG. 30 shows an operational flowchart of the sixth embodiment.

FIG. 30 shows an operational flowchart for realizing functions of the whole route searcher/selector. This process flow is realized as executed by the transmission line control processor 403 according to a program stored in a memory (corresponding to the memory 404 in the first embodiment shown in FIG. 4) not shown in FIG. 30.

First, processes of steps S1801–S1805 are the same as those in the fourth embodiment shown in FIG. 18. In these processes, the optimum route r is selected from the intra-switch logically available band data base 1701.

Next, in step S3001, values indicating actually available bands on each link forming the above described route r are extracted by referring to the intra-switch actually available band data base 2703.

Then, in step S3002, it is determined whether or not actual value data of each link is equal to or less than 70%.

If the determination in step S3002 is "yes" for all links forming the route r, the above described route r is outputted as a finally selected route to a call admission determiner not shown in FIG. 30. The following operation is the same as that performed in the fourth embodiment.

if the determination in step S3002 is "no", the processes following step S1802 are repeated after the route r is deleted.

Thus, a final route is selected as having an actual value equal to or less than 70% of available bands of all links forming the route obtained in the intra-switch actually available band data base 2703 the routes selected from the intra-switch logically available band data base 1701.

The above described determinative value "70%" is variable.

The 7th Embodiment

Figure 31:
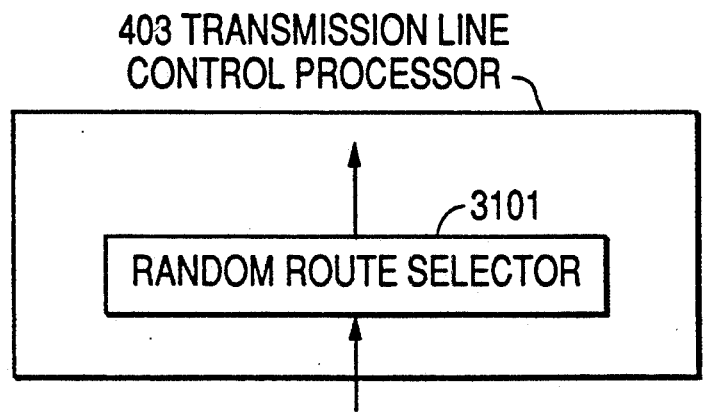
FIG. 31 shows a configuration of the main parts of the seventh embodiment.

FIG. 31 shows a configuration of the main parts of the seventh embodiment of the present invention, and shows a part of the functional configuration of a transmission line control processor.

The seventh embodiment corresponds to the fourth aspect of the present invention, as does the fourth embodiment. In the seventh embodiment shown in FIG. 31, the intra-switch logically available band data base 1701 and the whole route searcher/selector 1703 in the fourth embodiment shown in FIG. 17 are replaced with a random route selector 3101. To this random route selector 3101, a table not shown in FIG. 31 but similar to the routing information storage table 1702 for each connection shown in FIG. 17 is connected to a function in the same way as in the fourth embodiment. Other parts of the configuration of the seventh embodiment are the same as those in the fourth embodiment.

In FIG. 31, the random route selector 3101 selects a route at random from selectable routes according to input highway numbers and output highway numbers which are parts of a path selection request from the call processor 401 (refer to FIG. 17).

Figure 32:
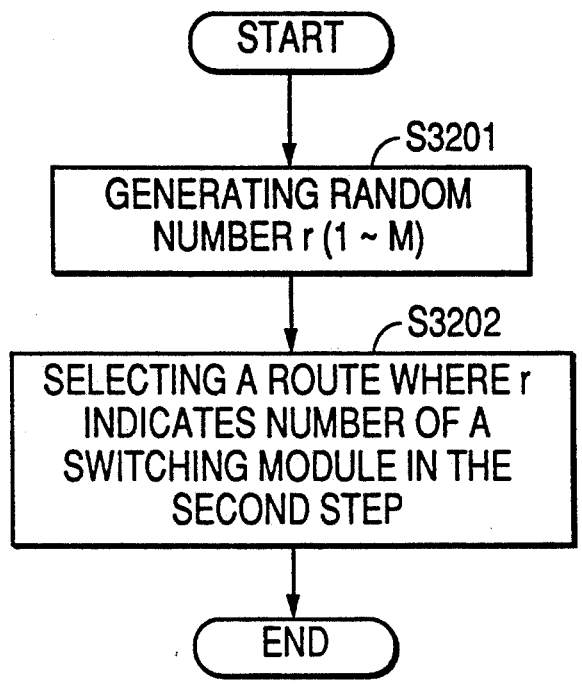
FIG. 32 shows an operational flowchart of a random route selector in the seventh embodiment.

FIG. 32 shows an operational flowchart for realizing functions of the random route selector 3101. This process flow is realized as executed by the transmission rout control processor 403 according to a program stored in a memory (corresponding to the memory 404 in the first embodiment shown in FIG. 4) not shown in FIG. 32.

First, in step S3201, random numbers r=1~M are generated.

Then, in step S3202, a route is selected with the value of the generated random number set as a number of a switching module in the second step (refer to the ATM switch 408 shown in FIG. 17) within the route.

As described in the fourth embodiment, when an input highway number and an output highway number of the ATM switch 408 (refer to FIG. 17) are specified at a path reservation request from the call processor 401, switching modules in the first and third steps are uniquely determined in the ATM switch 408. Accordingly, when a switching module in the second step is determined, a route is established between the specified input highway and the specified output highway in the ATM switch 408. In the seventh embodiment, a number of a switching module in the second step is determined randomly based on a random value r.

The 8th Embodiment

Figure 33:
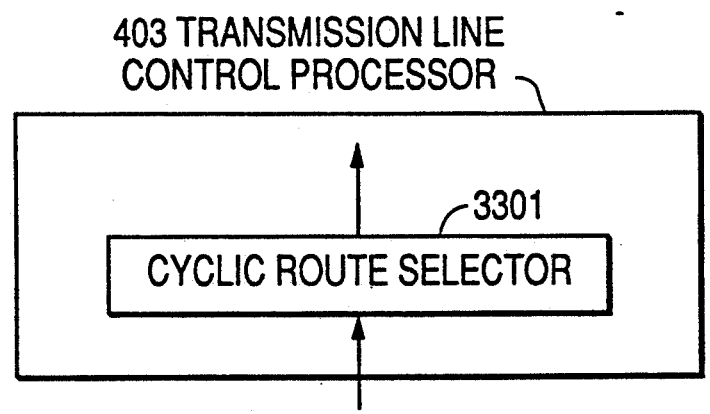
FIG. 33 shows a configuration of the main parts of the eighth embodiment.

FIG. 33 shows a configuration of the main parts of the eighth embodiment of the present invention, and shows a part of the functional configuration of a transmission line control processor.

The eighth embodiment corresponds to the fourth aspect of the present invention, as does the fourth embodiment. In the eighth embodiment shown in FIG. 33, the intra-switch logically available band data bas 1701 in the fourth embodiment shown in FIG. 17 and the whole route searcher/selector 1703 are replaced with a cyclic route selector 3301. To the cyclic route selector 3301, a table, not shown in FIG. 33, similar to the routing information storage table 1702 for each connection shown in FIG. 17 is connected to a function in the same way as in the fourth embodiment. Other parts of the configuration are the same as those in the fourth embodiment.

Figure 34:
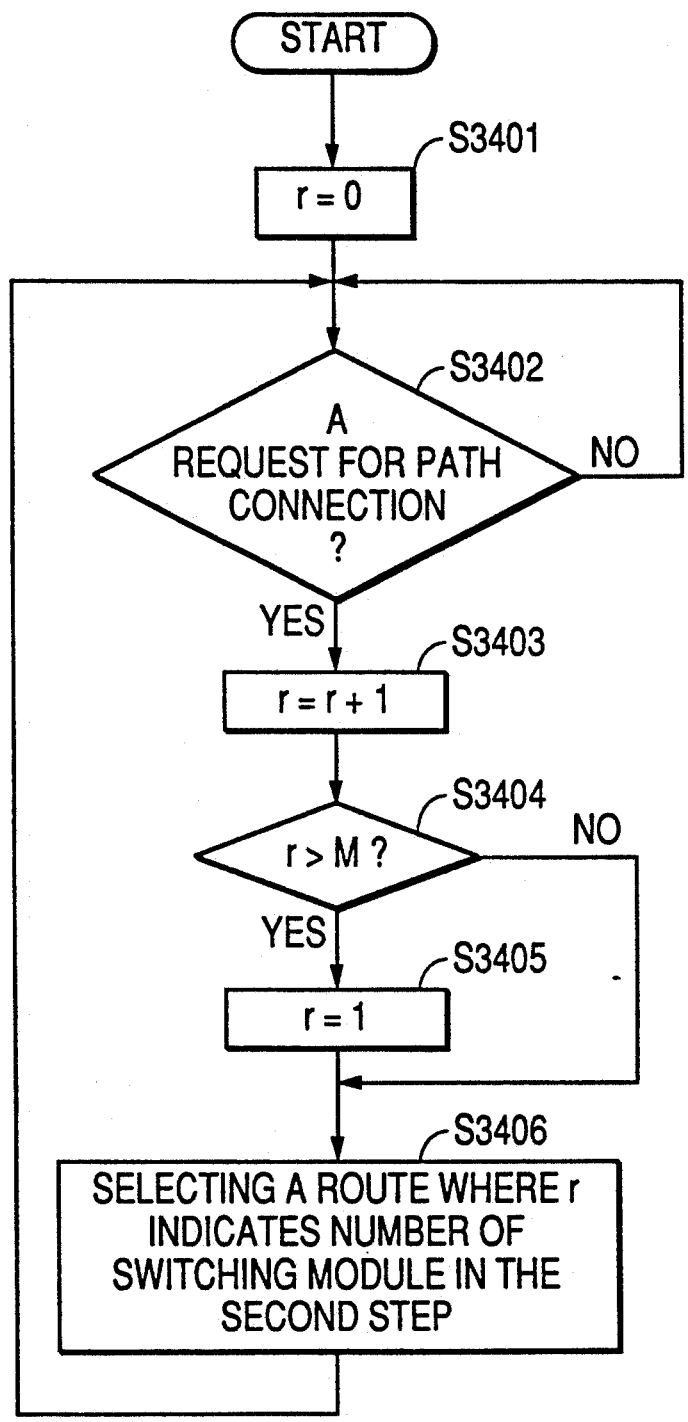
FIG. 34 shows an operational flowchart of a cyclic route selector in the eighth embodiment.

FIG. 34 shows an operational flowchart for realizing functions of the cyclic route selector 3301. This process flow is realized as executed by the transmission line control processor 403 according to a program stored in a memory (corresponding to the memory 404 in the first embodiment shown in FIG. 4) not shown in FIG. 34.

First, in step S3401, a variable r is initialized to zero (0).

Next, in step S3402, the call processor 401 (refer to FIG. 17) is monitored to determine whether or not it issues a path connection request.

If a path connection request is issued, the determination in step S3402 is "yes", and the variable r is increased by one (1) in the following step S3403.

Then, if the variable r does not exceed the maximum value M and the determination in step 3404 is "no", a route is selected in step S3406 with the variable r set as a number of a switching module of the second step (refer to the ATM switch 408 shown in FIG. 17).

However, when the variable r exceeds the maximum value M and the determination in step 3404 is "yes", a route is selected in step S3406 with the variable r set as a number of a switching module of the second step after the variable r is reset to 1 in step S3405.

After the process in step S 3406, the process in step S3402 is performed again, and the call processor 401 is monitored (refer to FIG. 17) to determine whether or not it issues a path connection request.

In the above described operation, the maximum value M corresponds to the number of switching modules in the second step. Therefore, a route corresponding to a path connection request is selected sequentially and cyclically by increasing the variable r in step S3403 every time a path connection request is issued.

The 9th embodiment

Figure 35:
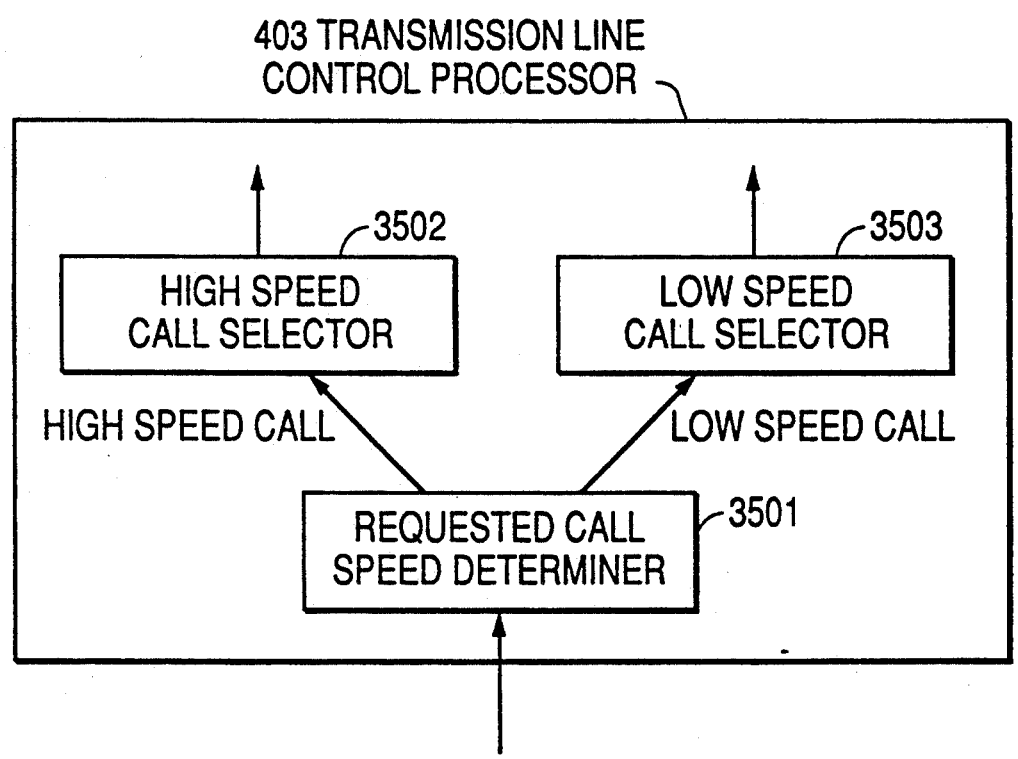
FIG. 35 shows a configuration of the main parts of the ninth embodiment.

FIG. 35 shows a configuration of the main parts of the ninth embodiment of the present invention, and shows a part of the functional configuration of the transmission line control processor.

The ninth embodiment corresponds to the fourth aspect of the present invention, as does the fourth embodiment.

In the ninth embodiment shown in FIG. 35, a requested call speed determiner 3501 determines whether a call corresponding to a path connection request from the call processor 401 (refer to FIG. 17) is a low speed call or a high speed call. If it is determined as a high speed call, a high speed call selector 3502 is selected; and if it is determined as a low speed call, a low speed call selector 3503 is selected to select a route.

The high speed call selector 3502 includes functions of all route searcher/selectors 1703 in the fourth embodiment shown in FIG. 17 where a data base similar to the intra-switch logically available band data base 1701 shown in FIG. 17 is connected, not shown in FIG. 35.

The low speed call selector 3502 includes any function of the random route selector 3101 in the seventh embodiment shown in FIG. 31 or the cyclic route selector 3301 in the eighth embodiment shown in FIG. 33.

Other parts of the configuration of the ninth embodiment are the same as those in the fourth embodiment.

Figure 36:
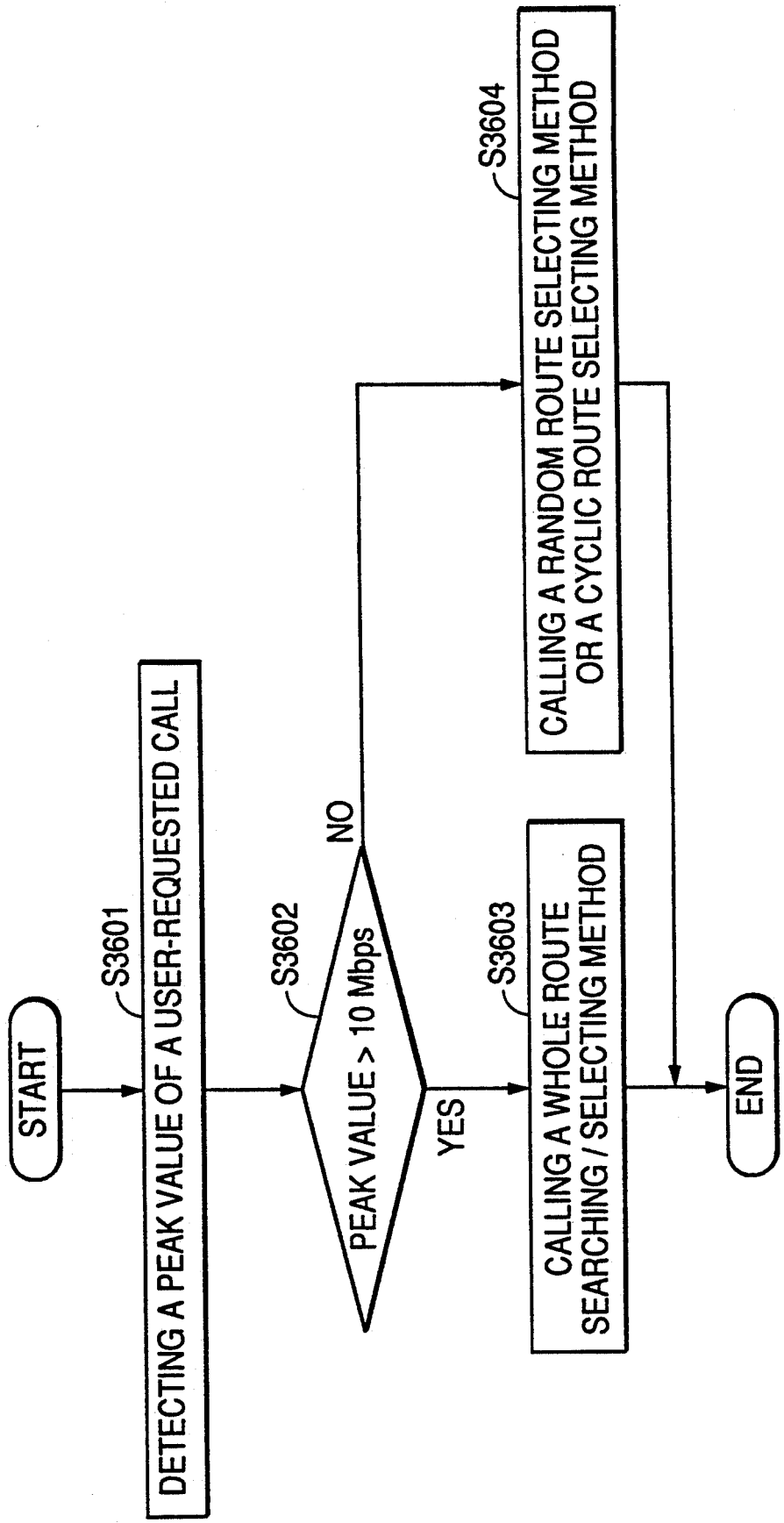
FIG. 36 shows an operational flowchart of a requested call speed determiner in the ninth embodiment.

FIG. 36 shows an operational flowchart for realizing functions of the requested call speed determiner 3501. This process flow is realized as executed by the transmission line control processor 403 according to a program stored in a memory (corresponding to the memory 404 in the first embodiment shown in FIG. 4), not shown in FIG. 36.

First, in step S3601, at a path connection request from the call processor 401 (refer to FIG. 17), a user call peak value (maximum speed) is detected.

Then, in step S3602, a determination is made as to whether or not the above described peak value is larger than 10 Mbps (mega-bit/second). A reference value for a call speed is 10 Mbps in this specification, but it can be any other optional value.

If a call peak value exceeds 10 Mbps and the determination in step S3602 is "yes", it means the requested call is a high speed call. Then, control is passed to the high speed call selector 3502. That is, in step S3603, functions similar to those of the whole route searcher/selector 1703 in the fourth embodiment shown in FIG. 17 are called. That is, a process flow similar to that of an operational flow-chart shown in FIG. 18 is performed.

The functions of the high speed call selector 3502 are not limited to functions similar to those of the whole route searcher/selector 1703, but can be determined according to other route selecting methods such as the route selecting method using an ascending table in the fifth embodiment shown in FIG. 25, and the route selecting method using two data bases: the intra-switch logically available band data base 1701 and the intra-switch actually available band data base 2703 in the sixth embodiment shown in FIG. 27.

On the other hand, if a call peak value is equal to or less than 10 Mbps and the determination in step S3602 is "no", it means the requested call is a low speed call. Therefore, control is passed to the low speed call selector 3503. Therefore, in step S3604, either functions similar to those of the random route selector 3101 in the seventh embodiment shown in FIG. 31 or functions similar to those of the cyclic route selector 3301 are called. That is, a process flow according to the operational flowchart shown in either FIG. 32 or FIG. 34 is performed.

Thus, the optimum route selecting method can be performed depending on whether a requested call is a high speed call or a low speed call.

The 10th Embodiment

Figure 37:
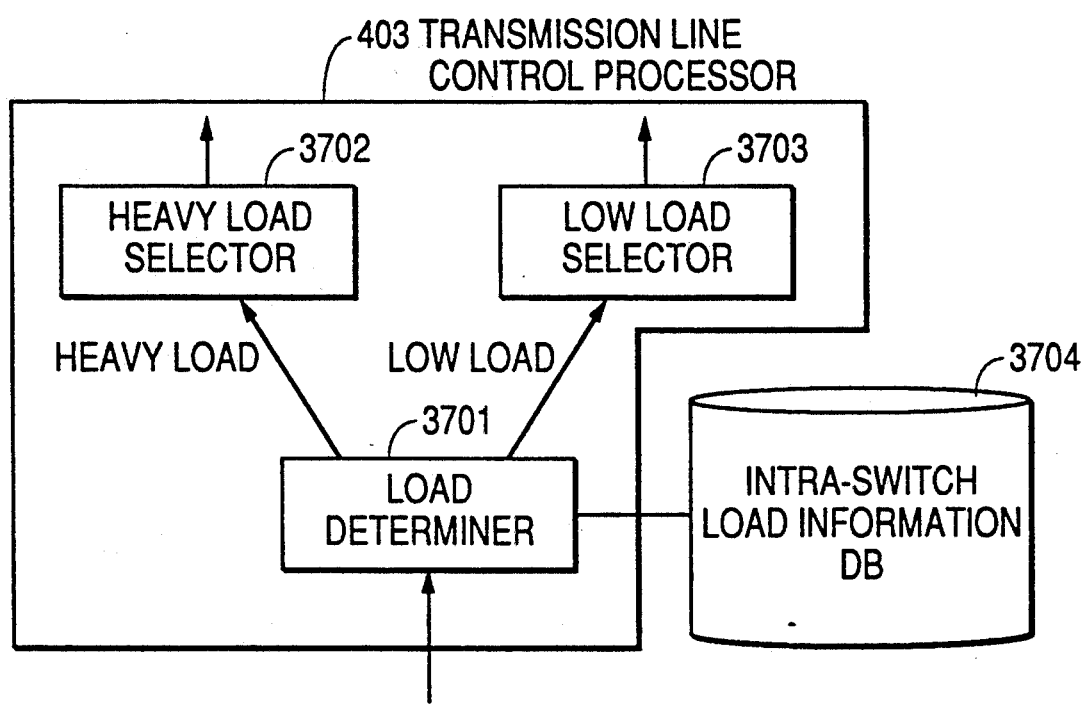
FIG. 37 shows a configuration of the tenth embodiment.

FIG. 37 shows a configuration of the main parts of the tenth embodiment of the present invention, and shows a part of the functional configuration of the transmission line control processor.

The tenth embodiment corresponds to the fourth aspect of the present invention, as does the fourth embodiment.

In the tenth embodiment shown in FIG. 37, an intra-switch load information data base (DB) 3704 stored in a storage unit (corresponding to the memory 204 in the first embodiment shown in FIG. 4), not shown in FIG. 37, stores load information in the ATM switch 408 (refer to FIG. 17). A load determiner 3701 refers to the contents of an intra-switch load information data base 3704 at a path connection request from the call processor 401 (refer to FIG. 17), and determines whether or not the loads of input and output switching modules corresponding to a requested call are heavy loads or low loads. If the load of at least one of either input or output switching modules is determined as a heavy load, a route is selected by a heavy load selector 3702. However, if the loads of both input and output switching modules are determined as low loads, a route is selected by a low load selector 3703.

The heavy load selector 3702 includes functions of all route searcher/selectors 1703 in the fourth embodiment shown in FIG. 17 where a data base similar to the intraswitch logically available band data base 1701 shown in FIG. 17 is connected, not shown in FIG. 37.

The low speed call selector 3702 includes any functions of either the random route selector 3101 in the seventh embodiment shown in FIG. 31 or the cyclic route selector 3301 in the eighth embodiment shown in FIG. 33.

Other parts of the tenth embodiment are the same as those of the fourth embodiment.

FIGS. 38A and 38B show the contents of an intraswitch load information data base 3704.

FIG. 38A shows the state of loads of M lines of links (output links) of switching modules $S_{11}, \ldots, S_{li}, \ldots, S_{iL}$ in the first step in the ATM switch 408 connected to M units of switching modules in the second step.

FIG. 38B shows the state of loads of M lines of links (input links) of switching modules $S_{31}, \ldots, S_{3k}, \ldots, S_{3P}$ in the third step in the ATM switch 408 connected to M units of switching modules in the second step.

In bits corresponding to a link of each switching module a value "0" is set if the link has a low load, while a value "1" is set if it has a heavy load. Thus, state of a load for each link is indicated.

Figure 39:
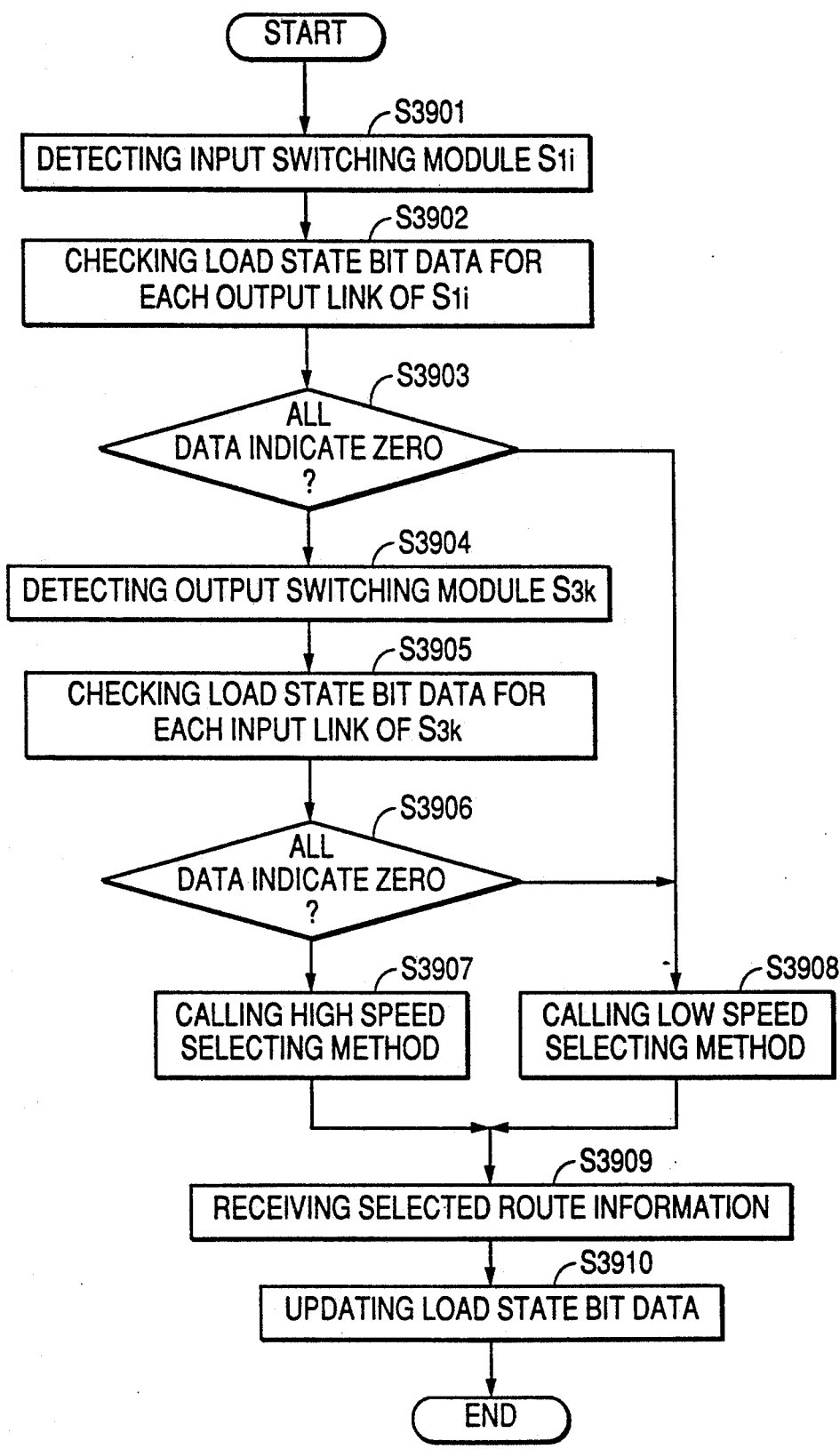
FIG. 39 shows an operational flowchart of a route selection in the tenth embodiment.

FIG. 39 shows an operational flowchart for realizing functions of the load determiner 3701. This process flow is realized as executed by the transmission line control processor 403 according to a program stored in a memory (corresponding to the memory 404 in the first embodiment shown in FIG. 4) not shown in FIG. 39.

First, in step S3901, a switching module in the first step (input switching module) is detected according to input highway numbers of the ATM switch 408 which are parts of a path reservation request from the call processor 401. The input switching module is named $S_{li}$ (refer to FIG. 17).

Next, in step S3902, a piece of load state bit data for each output link of the input switching module $S_{li}$ is checked.

In step S3903, a determination is made as to whether or not the checked load state bit data are all "0".

If all of these data are "0", the loads at all output links of the input switching module $S_{li}$ corresponding to the requested call are low loads. In this case, in step S3904, the corresponding switching module in the third step (output switching module) is detected according to output highway numbers in the ATM switch 408 which are parts of a path reservation request from the call processor 401. This output switching module is named $S_{3k}$ (refer to FIG. 17).

Then, in step S3905, the load state bit data of each input link of the output switching module $S_{3k}$ are checked.

In step S3906, a determination is made as to whether or not the checked load state bit data are all "0".

If all of these data are "0", the loads at all output links of the input switching module $S_{3K}$ corresponding to the requested call are a low loads.

As described above, when the loads of all links of both input and output switching modules corresponding to the requested call are low loads, control is passed to the heavy load selector 3702. That is, in step S3907, functions similar to those of the whole route searcher/selector 1703 in the fourth embodiment shown in FIG. 17 are called. That is, a process flow according to the operational flowchart shown in FIG. 18 is performed.

Functions of the heavy load selector 3702 are not limited to the functions similar to those of the whole route searcher/selector 1703, but can be determined by other route selecting method such as the route selecting methods using an ascending table in the fifth embodiment shown in FIG. 25, or the route selecting method using two data bases: the intraswitch logically available band data base 1701 and the intra-switch actually available band data base 2703 in the sixth embodiment shown in FIG. 27.

However, if either of the determinations in steps S3903 or S3906 indicates "no", that is, if a load of any link of either input or output switching module corresponding to the requested call is a heavy load, control is passed to the low load selector 3703. That is, in step S3908, either of functions similar to those of the random route selector 3101 in the seventh embodiment shown in FIG. 31 or functions similar to those of the cyclic route selector 3301 in the eighth embodiment shown in FIG. 33 are called. That is, a process flow according to the operational flowchart shown in FIG. 32 or FIG. 34 is performed.

After selecting a route according to the functions of the heavy load selector 3702 (function of step S3907) or the low load selector 3703 (function of step S3908), the load determiner 3701 receives information of routes selected from any of the above described selectors.

Then, in step S 3910, the load determiner 3701 determines whether or not an available band of the route notified by any of the above described selectors exceeds 70% of available bands of each link corresponding to the above described route of the input switching module $S_{li}$ and output switching module $S_{3K}$ corresponding to the requested call. Then, the load determiner 3701 sets a bit of the corresponding intra-switch load information data base 3704 to "1" for the link determined as "yes" by the load determiner 3701. The reference value "70%" can be variable to any optional value.

Thus, the optimum route can be selected depending on whether loads of input and output switching modules corresponding to the requested call are heavy loads or low loads.

The 11th Embodiment

Figure 40:
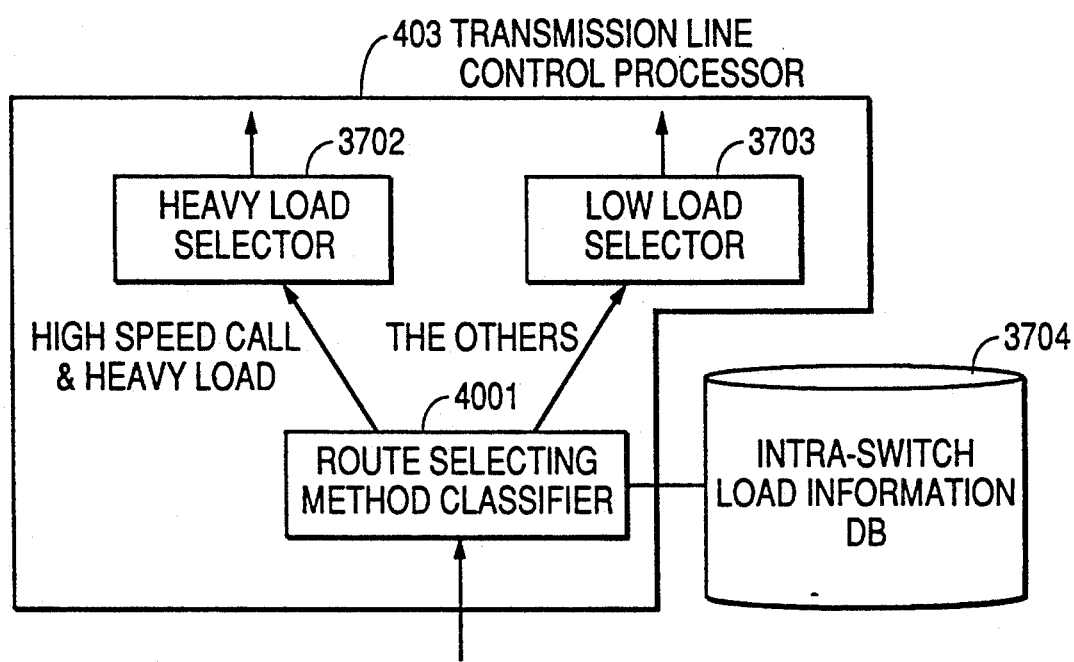
FIG. 40 shows a configuration of the main parts of the eleventh embodiment.

FIG. 40 shows a configuration of the main parts of the eleventh embodiment of the present invention, and shows a part of a functional configuration of a transmission line control processor.

The eleventh embodiment has a configuration similar to that of the tenth embodiment. In FIG. 40, however, the load determiner 3701 shown in FIG. 37 is replaced with a route selecting method classifier 4001. Other parts of the eleventh embodiment are the same as those in the tenth embodiment.

In FIG. 40, when a call in response to a path connection request from the call processor 401 (refer to FIG. 17) is a low speed call, and a load of each of input and output switching modules corresponding to a requested call is determined as a low load, a route is selected by the low load selector 3703.

However, when a call in response to a path connection request from the call processor 401 (refer to FIG. 17) is determined as a low speed call, or when a requested call is a low speed call, but a load of either of input and output switching modules corresponding to a requested call is determined as a heavy load, a route is selected by the heavy load selector 3702.

Figure 41:
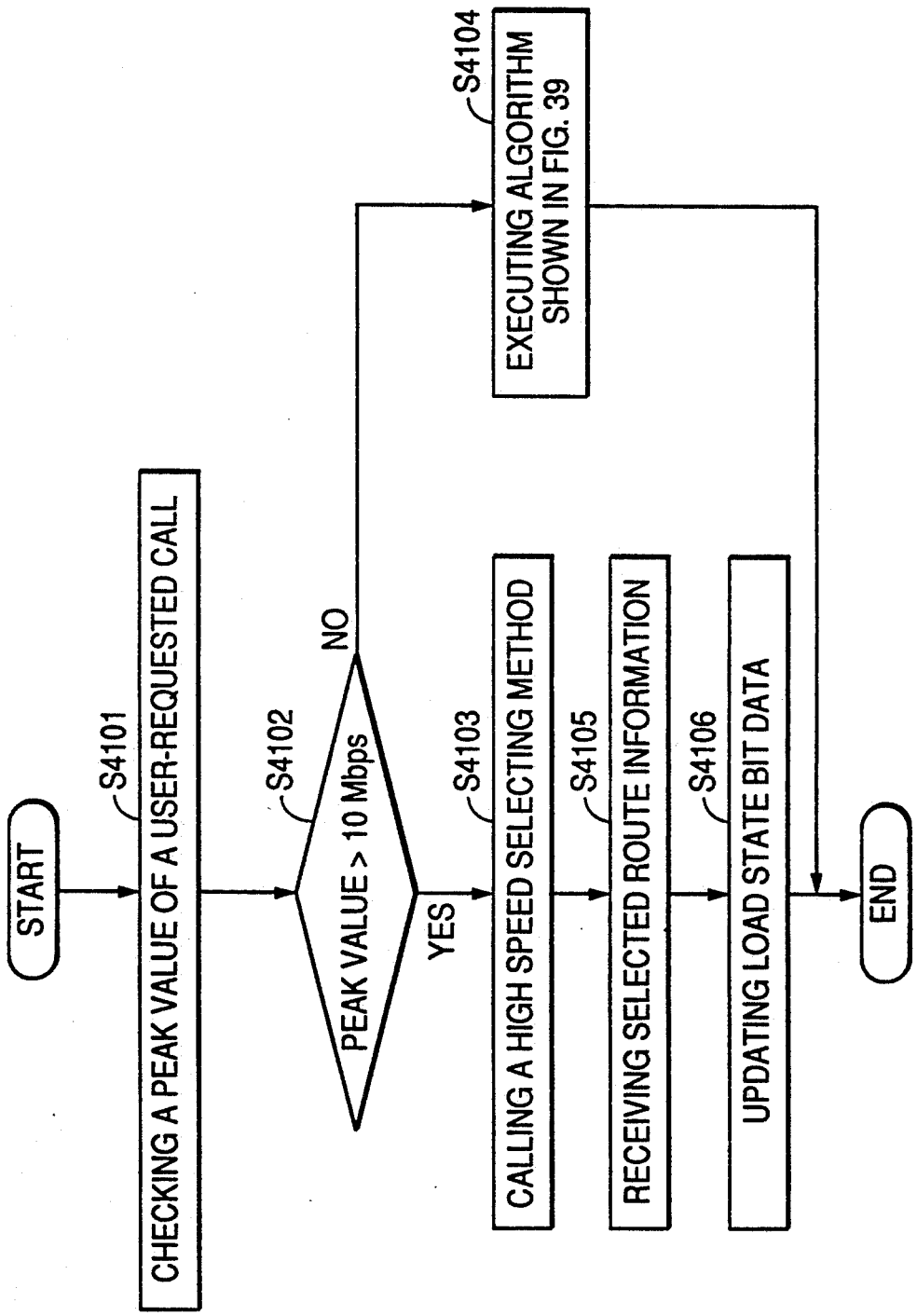
FIG. 41 shows an operational flowchart of a route selection in the eleventh embodiment.

FIG. 41 shows an operational flowchart for realizing functions of the route selecting method classifier 4001. This process flow is realized as executed by the transmission line control processor 403 according to a program stored in a memory (corresponding to the memory 404 in the first embodiment shown in FIG. 4), not shown in FIG. 41.

First, in step S4101, a peak value (maximum speed) of a user-requested call is detected according to a path connection request from the call processor 401 (refer to FIG. 17).

Next, in step S4102, a determination is made as to whether the above described call peak value is larger than 10 Mbps (mega bit/second). A reference value of a high speed call or a low speed call is defined as 10 Mbps in this specification, but it can be any other optional value.

When a call peak value exceeds 10 Mbps and the determination in step S4102 is "yes", control is passed to the heavy load selector 3702. Hereafter, each process in steps S4103, S4105, and S4106 is the same as that in steps S3907, S7909, and S3910 in the tenth embodiment shown in FIG. 39.

When a call peak value is smaller than 10 Mbps and the determination in step S4102 is "no", an algorithm identical to that in the tenth embodiment shown in FIG. 39 is called and executed. Thus, either the heavy load selector 3702 or the low load selector 3703 is read depending on whether loads of input and output switching modules corresponding to a requested call is a heavy load or a low load.

An example of operation of the eleventh embodiment based on the algorithm shown in FIG. 41 is further explained in detail. In the following operational examples, functions in the route selecting method use the following two data bases as functions of the heavy load selector 3702 shown in FIG. 37: the intra-switch logically available band data base 1701 and the intra-switch actually available band data base 2703 in the sixth embodiment shown in FIG. 27.

Suppose that the number of switching modules in each step in the ATM switch 408 (refer to FIG. 17) is three (that is, L=M=P=3), as in FIG. 21, and intra-switch logically available band data base 1701 (refer to FIG. 17) has the same contents as those shown in FIG. 22. Examples of the contents of the intra-switch actually available band data base 2703 (refer to FIG. 27) are shown in FIG. 42, and examples of the contents of the intra-switch load information data base 3704 (refer to FIG. 40) are shown in FIGS. 43A and 43B. These Figures correspond to FIGS. 38A and 38B.

Suppose, under the above described conditions, a path reservation request from the call processor 401 is requested as an input highway number HW11, output highway number HW33, and available band (maximum speed value) 1 Mbps (megabit/second).

In this case, the route selecting method classifier 4001 shown in FIG. 40 executes the algorithm shown in FIG. 41. Then, the determination in step S4102 is "yes", and the algorithm is as shown in FIG. 39.

Since all load state bit data shown in FIG. 43A associated with the input switch $S_{11}$ (refer to FIG. 21) corresponding to the input highway number HW11 are zero (0) the determination in step S3903 is "yes" Further, since all load state bit data shown in FIG. 43B associated with the output switch $S_{33}$ (refer to FIG. 21) corresponding to the output highway number HW33 are not zero (0), the determination in step S3906 is "no". Thus, the heavy load selector 3702 shown in FIG. 40 is called.

That is, the operational flowchart shown in FIG. 30 corresponding to the function of the whole route searcher/selector 2701 in the sixth embodiment shown in FIG. 27 is activated.

First, a route 3 comprising links $L_{113}$ and $L_{233}$ is selected as having the smallest available band by performing the processes in steps S1801–S1805 for the contents of the intra-switch logically available band data base shown in FIG. 22.

Then, in step S3001, an actual value of an available band in each link is extracted by referring to the contents of the intra-switch actually available band data base shown in FIG. 42 for the links $L_{113}$ and $L_{233}$.

Then, in step S3002, actual value data in each link are determined as less than 70%. Thus, route 3 is selected comprising the links $L_{113}$ and $L_{233}$ as the optimum route.

What is claimed is:

1. An ATM switching unit having a transmission line switch means in an asynchronous transmission mode comprising:

a call processor means for controlling signals and various services; and a transmission line control processor means for controlling a transmission line of said transmission line switch means at a request from said call processor means, wherein said transmission line control processor means comprises:

a subscriber line management means for managing the resources of subscriber lines accommodated in said transmission line switch means at a request of said call processor means;

an inter-station line management means for managing the resources of inter-station lines accommodated by said transmission line switch means at a request of said call processor means; and a path control means for controlling a path connection by said transmission line switch means at a request of said call processor means.

2. An ATM switching unit having a configuration in which a plurality of transmission line switch means in the asynchronous transmission mode are connected by a transmission line connection means comprising:

a plurality of call processor means for controlling signals and various services in association with each of said transmission line switch means;

a plurality of transmission line control processor means for controlling a transmission line of each of said transmission line switch means at a request of each of said call processor means; and a bus means for connecting each of said call processor means and each of said transmission line control processor means, wherein each of said call processor means comprises a selection means for selecting the optimum output line by asking each of said transmission line control processor means for information of an available band of an output line of each of said transmission line switch means; and a communication means for communicating with other call processor means; and each of said transmission line control processor means comprises a subscriber line management means for managing the resources of subscribers accommodated in said transmission line switch means at a request of each of said call processor means corresponding to each of said transmission line control processor means;

an inter-station line management means for managing the resources of inter-station lines accommodated in said transmission line switch means at a request of each of said call processor means corresponding to each of said transmission line control processor means;

a path control means for controlling path connection by said transmission line switching means at a request of each of said call processor means corresponding to each transmission line control processor means; and a transmission line connection management means for managing the resources of said transmission line connecting means at a request of each of said call processor means corresponding to each transmission line control processor means.

3. An ATM switching unit having a configuration in which a plurality of transmission line switch means in the asynchronous transmission mode are connected by a transmission line connection means comprising:

a plurality of call processor means for controlling signals and various services in association with each of said transmission line switch means;

a plurality of transmission line control processor means for controlling a transmission line of each of said transmission line switch means at a request of each of said call processor means;

a bus means for connecting each of said call processor means and each of said transmission line control processor means; and a shared memory mean for storing information indicating an available band of an output line of each of said transmission line switch means.

4. An ATM switching unit according to claim 3, wherein;

each of said call processor means comprises a selection means for selecting the optimum output line by extracting information of an available band of an output line of each of said transmission line switch means from said shared memory means; and a communication means for communicating with other call processor means; and each of said transmission line control processor means comprises a subscriber line management means for managing the resources of subscriber lines accommodated in said transmission line switch means at a request of each of said call processor means corresponding to each of said transmission line control processor means; an inter-station line management means for managing the resources of inter-station lines accommodated in said transmission line switch means at a request of each of said call processor means corresponding to each of said transmission line control processor means; a path control means for controlling path connection by said transmission line switch means at a request of each of said call processor means corresponding to each of said transmission line control processor means; and a transmission line connection management means for managing the resources of said transmission line connecting means at a request of each of said call processor means corresponding to each of said transmission line control processor means.

5. An ATM switching unit having a transmission line switch means in an asynchronous transmission mode comprising:

a call processor means for controlling signals and various services; and a transmission line control processor means for controlling a transmission line of said transmission line switch means at a request from said call processor means, wherein:

said transmission line switch means further comprises a configuration in which switching modules comprising a plurality of input links and a plurality of output links are located in the form of a matrix where each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and said transmission line control processor means comprises:

a route selection means for selecting a route in said transmission line switch means connecting an input highway with an output highway specified by said call connection request; and a call reception determination means for determining whether or not a call corresponding to said call connection request is admitted through a route selected by said route selection means according to the information of an available band for a call specified by said call connection request.

6. An ATM switching unit according to claim 5, wherein said route selection means and said call reception determination means are provided in a transmission line control processor means for controlling a transmission line of said transmission line switch means.

7. An ATM switching means according to claim 5: wherein said call processor means outputs a call connection request including information of a call input highway, a call output highway, and a call required available band; and said transmission line control processor means comprises a requested call speed determination means for determining whether said call is a low speed call or a high speed call according to the information of an available band of a call specified by said call connection request;

a first route selection means for selecting, according to the first selecting method, a route in said transmission line switch means for connecting an input highway with an output highway specified by said call connection request when said call is determined as a high speed call by said requested call speed determination means;

a second route selection means for selecting, according to the second selecting method, a route in said transmission line switch means for connecting an input highway with an output highway specified by said call connection request when said call is determined as a low speed call by said requested call speed determination means; and a call reception determination means for determining whether or not a call corresponding to said call connection request is admitted through a route selected by said first or second route selection means according to information of an available band of said requested call specified by said call connection request.

8. An ATM switching unit according to claim 7, wherein said first route selection means, said second route selection means and said call reception determination means are provided in a transmission line control processor means for controlling a transmission line in said transmission line switch means.

9. An ATM switching unit according to claim 7 additionally comprising an intra-switch logically available band storage data base means for storing information of an available band of all links in said transmission line switch, wherein said first route selection means is a whole route search/selection means for selecting a route having the largest available band of routes in said transmission line switch means connecting an input highway to an output highway specified by said call connection request by accessing said intra-switch logically available band storage data base means.

10. An ATM switching unit according to claim 7 additionally comprising an intra-switch logically available band storage data base means for storing information of an available band of all links in said transmission line switch, wherein said first route selection means is a whole route search/selection means for selecting a route having the largest available band in a link forming a route and connecting said switching module means in the first step to that in the second step among routes in said transmission line switch means connecting an input highway to an output highway specified by said call connection request by accessing said intraswitch logically available band storage data base means.

11. An ATM switching unit according to claim 7 comprising:

an intra-switch logically available band storage data base means for storing information of available bands of all links in said transmission line switch;

a traffic monitor means for monitoring an actual value indicating a usage rate of each link in said transmission line switch; and an intra-switch actually available data base means for storing an actual value of a usage rate of each link in said transmission line switch to be monitored by said traffic monitor means, wherein said first route selection means is a whole route search/selection means for selecting a route having the largest available band and a usage rate less than the predetermined value of all links forming the route of routes in said transmission line switch means connecting an input highway to an output highway specified by said call connection request by accessing said intra-switch logically available band storage data base means and said intra-switch actually available band data base means.

12. An ATM switching unit according to claim 7, wherein said second route selection means is a random route selection means for randomly selecting a route from routes in said transmission line switch means connecting an input highway and an output highway specified by said call connection request.

13. An ATM switching means according to claim 7, wherein said second route selection means is a cyclic route selection means for selecting a route following the route selected previously from routes in said transmission line switch means connecting an input highway to an output highway specified by said call connection request.

14. An ATM switching unit having a transmission line switch means in an asynchronous transmission mode comprising:

a call processor means for controlling signals and various services;

a transmission line control processor means for controlling a transmission line of said transmission line switch means at a request from said call processor means; and an intra-switch logically available band storage data base means for storing information of available bands of all links in said transmission line switch, and said transmission line switch means further has a configuration in which switching modules comprising a plurality of input links and a plurality of output links are located in the form of a matrix in which each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and said transmission line control processor means comprises a whole route search/selection means for selecting a route having the largest available band of routes in said transmission line switch means connecting an input highway to an output highway specified by said call connection request by accessing said intra-switch logically available band storage data base means; and a call reception determination means for determining whether or not a call corresponding to said call connection request is admitted through a route selected by said whole route search/selection means according to the information of an available band of a call specified by said call connection request.

15. An ATM switching unit according to claim 14, wherein said whole route search/selection means and said call reception determination means are provided in a transmission line control processor means for controlling a transmission line in said transmission line switch means.

16. An ATM switching unit having a transmission line switch means in an asynchronous transmission mode comprising:

a call processor means for controlling signals and various services;

a transmission line control processor means for controlling a transmission line of said transmission line switch means at a request from said call processor means; and an intra-switch logically available band storage data base means for storing information of available bands of all links in said transmission line switch; and wherein said transmission line switch means further comprises a configuration in which switching modules comprising a plurality of input links and a plurality of output links are located in the form of a matrix in which each input highway, that is, a input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and a whole route search/selection means for selecting a route having the largest available band in a link forming a route and connecting said switching module means in the first step to that in the second step of routes in said transmission line switch means connecting an input highway to an output highway specified by said call connection request by accessing said intra-switch logically available band storage data base means; and a call reception determination means for determining whether or not a call corresponding to said call connection request is admitted through a route selected by said whole route search/selection means according to the information of an available band of a call specified by said call connection request.

17. An ATM switching unit according to claim 16, wherein
said whole route search/selection means and said call reception determination means are provided in a transmission line control processor means for controlling a transmission line in said transmission line switch means.

18. An ATM switching unit having a transmission line switch means in an asynchronous transmission mode comprising:

a call processor means for controlling signals and various services;

a transmission line control processor means for controlling a transmission line of said transmission line switch means at a request from said call processor means;

an intra-switch logically available band storage data base means for storing information of available bands of all linked in said transmission line switch;

a traffic monitor means for monitoring an actual value indicating a usage rate of each link in said transmission line switch; and an intra-switch actually available data base means for storing an actual value of a usage rate of each link in said transmission line switch to be monitored by said traffic monitor means, and wherein said transmission line switch means further comprises a configuration in which switching modules comprising a plurality of input links and a plurality of output links are located in the form of a matrix in which each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and said transmission line control processor means comprises a whole route search/selection means for selecting a route having the largest available band and a usage rate less than the predetermined value of all links forming the route in said transmission line switch means connecting an input highway to an output highway specified by said call connection request by accessing said intra-switch logically available band storage data base means and said intra-switch actually available band data base means; and a call reception determination mean for determining whether or not a call corresponding to said call connection request is admitted through a route selected by said whole route search/selection means according to the information of an available band of a call specified by said call connection request.

19. An ATM switching unit according to claim 18, wherein
said whole route search/selection means and said call reception determination means are provided in a transmission line control processor means for controlling a transmission line in said transmission line switch means.

20. An ATM switching unit having a transmission line switch means in an asynchronous transmission mode comprising:

a call processor means for controlling signals and various services; and a transmission line control processor means for controlling a transmission line of said transmission line switch means at a request from said call processor means, wherein said transmission line switch means further comprises a configuration in which switching modules comprising a plurality of input links and a plurality of output links are located in the form of a matrix where each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and said transmission line control processor means comprises a random route selection means for randomly selecting a route from routes in said transmission line switch means connecting an input highway and an output highway specified by said call connection request; and a call reception determination means for determining whether or not a call corresponding to said call connection request is admitted through a route selected by said random route selection means according to the information of an available band of a call specified by said call connection request.

21. An ATM switching unit according to claim 20, wherein said random route selection means and said call reception determination means are provided in a transmission line control processor means for controlling a transmission line in said transmission line switch means.

22. An ATM switching unit having a transmission line switch means in an asynchronous transmission mode comprising:

a call processor means for controlling signals and various services; and a transmission line control processor means for controlling a transmission line of said transmission line switch means at a request from said call processor means, wherein:

said transmission line switch means further comprises a configuration in which switching modules comprising a plurality of input links and a plurality of output links are located in the form of a matrix in which each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

said call processor means outputs a call connection request including information of a call input highway, a call output highway, and a call-required available band; and said transmission line control processor means comprises a cyclic route selection means for selecting a route following the route selected previously from routes in said transmission line switch means connecting an input highway to an output highway specified by said call connection request; and a call reception determination means for determining whether or not a call corresponding to said call connection request is admitted through a route selected by said cyclic route selection means according to the information of an available band of a call specified by said call connection request.

23. An ATM switching unit according to claim 22, wherein said cyclic route selection means and said call reception determination means are provided in a transmission line control processor means for controlling a transmission line in said transmission line switch means.

24. An ATM switching unit having a transmission line switch means in an asynchronous transmission mode comprising:

a transmission line switch means having a configuration in which switching modules comprising a plurality of input links and a plurality of output links are located in the form of a matrix in which each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

a call processor means for outputting a call connection request including information of a call input highway, a call output highway, and a call-required available band;

an intra-switch load information data base means for storing load information of each switching module in said transmission line switch means;

a load determination means for determining the size of a load in said switching module in the first step where input highways specified by said call connection request are connected and the size of a load in said switching module in the last step where output highways specified by said call connection request are connected;

a first route selection means for selecting, according to the first selecting method, a route in said transmission line switch means connecting an input highway to an output highway specified by said call connection request when said load determination means determines that a load of a switching module in either said first or said last step is large;

a second route selection means for selecting, according to the second selecting method, a route in said transmission line switch means connecting an input highway to an output highway specified by said call connection request when said load determination means determines that loads of a switching module in either said first or said last step are small; and a call reception determination means for determining whether or not a call corresponding to said call connection request is admitted through a route selected by said first or second route selection means according to information of an available band of said requested call specified by said call connection request.

25. An ATM switching unit having a transmission line switch means in an asynchronous transmission mode comprising:

a transmission line switch means having a configuration in which switching modules comprising a plurality of input links and a plurality of output links are located in the form of a matrix in which each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

a call processor means for outputting a call connection request including information of a call input highway, a call output highway, and a call-required available band;

an intra-switch load information data base means for storing load information of each switching module means in said transmission line switch means;

a requested call speed determination means for determining whether said call is a low speed call or a high speed call according to information of an available band of a call specified by said call connection request;

a load determination means for determining the size of a load in said switching module in the first step where input highways specified by said call connection request are connected and the size of a load in said switching module in the last step where output highways specified by said call connection request are connected;

a first route selection means for selecting, according to the first selecting method, a route in said transmission line switch means connecting an input and output highways specified by said call connection request when said requested call speed determination means determines that said call is a high speed call, or when said load determination means determines that a load in a switching module in either said first or said last step is large;

a second route selection means for selecting, according to the second selecting method, a route in said transmission line switch means connecting input and output highway specified by said call connection request when said requested call speed determination means determines that said call is a low speed call, or when said load determination means determines that loads in a switching module in said first and said last step are small;

a call reception determination means for determining whether or not a call corresponding to said call connection request is admitted through a route selected by said first or second route selection means according to information of an available band of said requested call specified by said call connection request.

26. An ATM switching unit having a transmission line switch means in an asynchronous transmission mode comprising:

a transmission line switch means having a configuration where switching modules comprising a plurality of input links and a plurality of output links are located in the form of a matrix where each input highway, that is, an input to an ATM switching unit, is connected to each switching module in the first step; each output highway, that is, an output from the ATM switching unit, is connected to each switching module in the last step; and each switching module between the first and the last step modules is connected to links from a module in the previous step in each row, thus forming a transmission line switch;

a call processor means for outputting a call connection request including information of a call input highway, a call output highway, and a call required available band;

a route selection means for selecting a routein said transmission line switch means connecting an input highway and an output highway specified by said call connection request; and a call reception determination means for determining whether or not a call corresponding to said call connection request is admitted through a route selected by said route selection means according to the information of an available band for a call specified by said call connection request.

27. An ATM switching unit according to claim 26, wherein said route selection means and said call reception determination means are provided in a transmission line control processor means for controlling a transmission line of said transmission line switch means.

28. An ATM switching unit according to claim 26 further comprising an intra-switch logically available band storage data base means for storing information of available bands of all links in said transmission line switch;

a whole route search/selection means for selecting a route having the largest available band among routes in said transmission line switch means connecting an input highway to an output highway specified by said call connection request by accessing said intra-switch logically available band storage data base means; and a call reception determination means for determining whether or not a call corresponding to said call connection request is admitted through a route selected by said whole route search/selection means according to the information of an available band of a call specified by said call connection request.

29. An ATM switching unit according to claim 28, wherein said whole route search/selection means and said call reception determination means are provided in a transmission line control processor means for controlling a transmission line in said transmission line switch means.

30. An ATM switching unit according to claim 26, further comprising an intra-switch logically available band storage data base means for storing information of available bands of all links in said transmission line switch;

a traffic monitor means for monitoring an actual value indicating a usage rate of each link in said transmission line switch;

an intra-switch actually available data base means for storing an actual value of a usage rate of each link in said transmission line switch to be monitored by said traffic monitor means; and a whole route search/selection means for selecting a route having the largest available band and a usage rate less than the predetermined value of all links forming the route among routes in said transmission line switch means connecting an input highway to an output highway specified by said call connection request by accessing said intra-switch logically available band storage data base means and said intra switch actually available band data base means; and a call reception determination means for determining whether or not a call corresponding to said call connection request is admitted through a route selected by said whole route search/selection means according to the information of an available band of a call specified by said call connection request.

* * * * *